(12) United States Patent
Faris

(10) Patent No.: US 9,606,553 B2
(45) Date of Patent: Mar. 28, 2017

(54) SANSSOIL (SOIL-LESS) INDOOR FARMING FOR FOOD AND ENERGY PRODUCTION

(71) Applicant: Sadeg M. Faris, Pleasantville, NY (US)

(72) Inventor: Sadeg M. Faris, Pleasantville, NY (US)

(*) Notice: Subject to any disclaimer, the term of this patent is extended or adjusted under 35 U.S.C. 154(b) by 588 days.

(21) Appl. No.: 13/887,333

(22) Filed: May 5, 2013

(65) Prior Publication Data

US 2014/0330406 A1 Nov. 6, 2014

(51) Int. Cl.
*A01G 31/00* (2006.01)
*A01G 3/00* (2006.01)
*G05D 27/02* (2006.01)

(52) U.S. Cl.
CPC ............. *G05D 27/02* (2013.01); *A01G 31/00* (2013.01); *Y02P 60/12* (2015.11); *Y02P 60/216* (2015.11)

(58) Field of Classification Search
USPC ............. 47/59 R, 62 R, 64, 59 S, 60, 63, 17, 47/58.1 R, 58.1 LS, DIG. 6
See application file for complete search history.

(56) References Cited

U.S. PATENT DOCUMENTS

| | | | |
|---|---|---|---|
| 3,931,695 A | 1/1976 | Widmayer | |
| 4,146,993 A * | 4/1979 | Freeman, Sr. | 47/17 |
| 7,617,057 B2 * | 11/2009 | May et al. | 702/62 |
| 8,074,397 B2 * | 12/2011 | Yoneda et al. | 47/58.1 LS |
| 9,137,874 B2 * | 9/2015 | Maxik et al. | |
| 2004/0109302 A1 | 6/2004 | Yoneda et al. | |
| 2005/0252078 A1 * | 11/2005 | Albright et al. | 47/58.1 LS |
| 2009/0223128 A1 * | 9/2009 | Kuschak | 47/62 N |
| 2011/0252705 A1 | 10/2011 | Van Gemert et al. | |
| 2012/0054061 A1 * | 3/2012 | Fok et al. | 705/26.5 |
| 2014/0115958 A1 * | 5/2014 | Helene et al. | 47/17 |
| 2014/0259920 A1 * | 9/2014 | Wilson | 47/62 R |
| 2014/0318012 A1 * | 10/2014 | Fujiyama | 47/62 R |
| 2014/0352211 A1 * | 12/2014 | Liotta | 47/58.1 LS |

OTHER PUBLICATIONS

1 High Level Experts Forum, in Rome, Oct. 12-13, 2009, entitled "How to Feed the World 2050," printed Jan. 27, 2014, from http://www.fao.org/wsfs/forum2050/wsfs-forum/en/ , 2 pages.

(Continued)

*Primary Examiner* — Andrea Valenti
(74) *Attorney, Agent, or Firm* — Abelman, Frayne & Schwab

(57) ABSTRACT

To produce food, plants rely on three main ingredients, sun energy, water, and carbon dioxide, the cost of which is zero. To address the food and energy security concerns, two mysteries are resolved for the first time: i)—Photosynthetic efficiency is known to be very low, the scientific full accounting for all the losses is lacking; ii)—Fanning is known to be profitable, yet accounting for the zero cost of solar energy is not understood. This inventor resolved them by the derivation of a simple mathematical law, AgriPAL, comprising explicitly, a new solar gain factor >200× which offset the low efficiency of ~0.005. In the absence of the sun, the newly found solar gain goes to 1. Since SanSSoil enables harnessing the third dimension, the sky is the limit. Water saving of >100 is realized through the controlled enclosed environment.

13 Claims, 18 Drawing Sheets

(56) References Cited

OTHER PUBLICATIONS

Idso, Center for the Study of Carbon Dioxide and Global Change, CO2 Science, Jun. 15, 2011, "Estimates of Global Food Production in the Year 2050: Will We Produce Enough to Adequately Feed the World?" pp. 1-43.
Wikipedia, "Food vs. Fuel," printed Nov. 5, 2013 from http://en.wikipedia.org/wiki/Food_vs._fuel, 19 pages.
Stiles et al., University of Arkansas, FSA9512, "Diagnosing a Farm Profitability Problem," published 2007, 4 pages.
Sheehan et al., "National Renewable Energy Laboratory, NREL/TP-580-24190, A Look Back at the U.S. Department of Energy's Aquatic Species Program: Biodiesel from Algae," Jul. 1998, 328 pages.
Lundquist et al., Energy Biosciences Institute, University of California, "A Realistic Technology and Engineering Assessment of Algae Biofuel Production," Oct. 2010, 178 pages.
Baker, Department of Biological Sciences, University of Essex, Colchester, UK, "Prospects for increasing the efficiency of photosynthesis in crop plants," presentation slides from the Food Security and Safety Symposium at Lancaster University, Sep. 13, 2010, 20 pages.
Grove, Department of Agricultural Economics, University of the Free State, Bloemfontein, South Africa, "Review of whole-farm economic modelling for irrigation farming," presented at the Water Research Commission 40-Year Celebration Conference, Kempton Park, Aug. 31-Sep. 1, 2011, pp. 789-796.
Taylor et al., "Agricultural Household Models: Genesis, Evolution, and Extensions," Aug. 2002 advance publication of Review of Economics of the Household, vol. 1, No. 1 (2003), 45 pages.
Kinambuga Dennis, Research Thesis, "Evaluation of the Constraints to Profitable Smallholder Dairying: A Case of Nakuru County, Kenya," Nov. 2010, 76 pages.
Chudleigh et al., 46th Annual Conference of the Australian Agricultural and Resources Economics Society, Canberra, "Modelling profitable and sustainable farming systems in Central Queensland," Feb. 2001, 45 pages.
Hadley, "Productivity and Farm Profit a Microeconomic Analysis of the Cereal Sector in England and Wales," Applied Economics 40, 05 (2008) pp. 613-624 (submitted manuscript).
Singh et al., "The effect of different water allocations on rice farm profitability in the MIA," IREC Farmers' Newsletter, No. 170, Spring 2005, pp. 49-51.
"EU Cereal Farms Report, 2011," Brussels, Feb. 2012, 108 pages.
Andersons Northern, "Cereals Outlook—Maintaining Arable Profitability," Jun. 16, 2012, printed Nov. 5, 2013 from http://www.andersonsnorthern.co.uk/index.php?option=com_content&view=article&id=41:cereals-outlook-maintaining-arable-profitability&catid=24:news-general&Itemid=18 (2 pages).
Oliver Wyman, White Paper, "Food/Fuel Price Dynamics: Developing a Framework for Strategic Investments," 2010, 16 pages.
Wikipedia, "Phototroph," printed Nov. 5, 2013 from http://en.wikipedia.org/wiki/Phototroph, 2 pages.
Wikipedia, "Michaelis Menten kinetics," printed Nov. 5, 2013 from http://en.wikipedia.org/wiki/Michaelis%E2%80%93Menten_kinetics, 7 pages.
Logsong, "What if farming for profit really isn't possible," published 2013, printed Nov. 5, 2013 from http://www.landinstitute.org/vnews/display.v/ART/2002/06/21/3d1a6b900f801, 2 pages.
Soetan et al., "The importance of mineral elements for humans, domestic animals and plants: A review," African Journal of Food Science vol. 4(5), May 2010, pp. 200-222.
Marshall et al., ABC News, "Arsenic in Rice: New Report Finds Worrisome Levels," Sep. 19, 2012, printed Nov. 5, 2013 from http://abcnews.go.com/Health/arsenic-rice-report-finds-worrisome-levels/story?id=17267872#. UGFvzKP30ls, 2 pages.
World Health Organization, "Exposure to Arsenic: A Major Public Health Concern," 2010, 5 pages.
Huffington Post, RICE Act: Congressmen Plan to Introduce Bill that would Limit Arsenic Levels in Rice, Sep. 21, 2012, printed Nov. 5, 2013 from http://www.huffingtonpost.com/2012/09/21/rice-act-arsenic-delauro-pallone-lowey_n_1904490.html, 1 page.
BR Global, LLC, "Micro Nutrients and Secondary Nutrients," circa 2008 (exact publication unknown), 6 pages.
North Country Organics, Trace Elements, circa 2009 (exact publication unknown), 2 pages.
Shabala, "Physiological and cellular aspects of phytotoxicity tolerance in plants: the role of membrane transporters and implications for crop breeding for waterlogging tolerance," New Phytologist (2010), pp. 1-10.
Baumgarten et al., "Phytotoxicity (Plant tolerance)," Agency for Health and Food Safety, Vienna, Apr. 2004, pp. 1-36.
Wikipedia, "Plastid," printed Nov. 5, 2013 from http://en.wikipedia.org/wiki/Plastid, 4 pages.
Tennessen et al., "Efficiency of photosynthesis in continuous and pulsed light emitting diode irradiation," Photosynthesis Research (1995) 44:261-269.

* cited by examiner

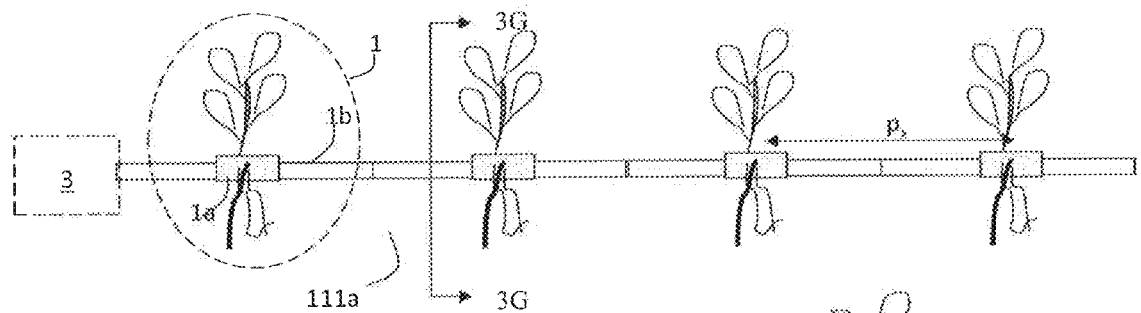
FIG. 3F
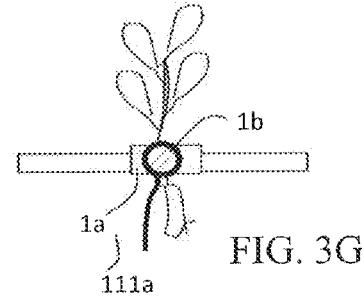
FIG. 3G
FIG. 3H
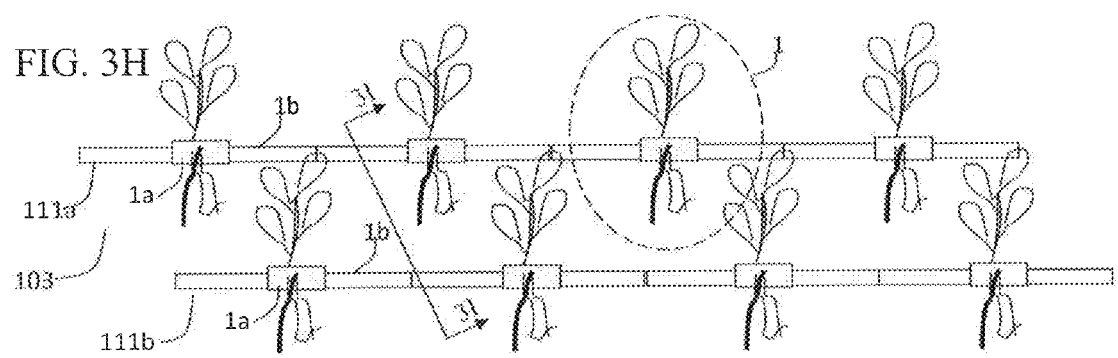
FIG. 3I
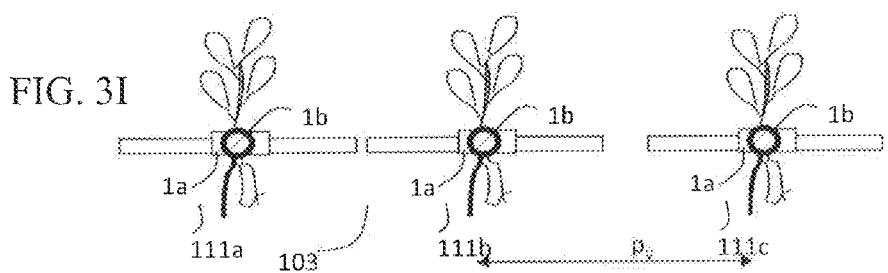

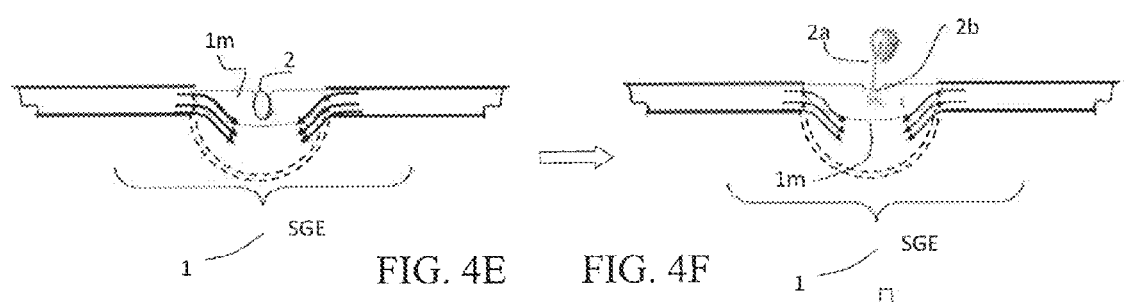
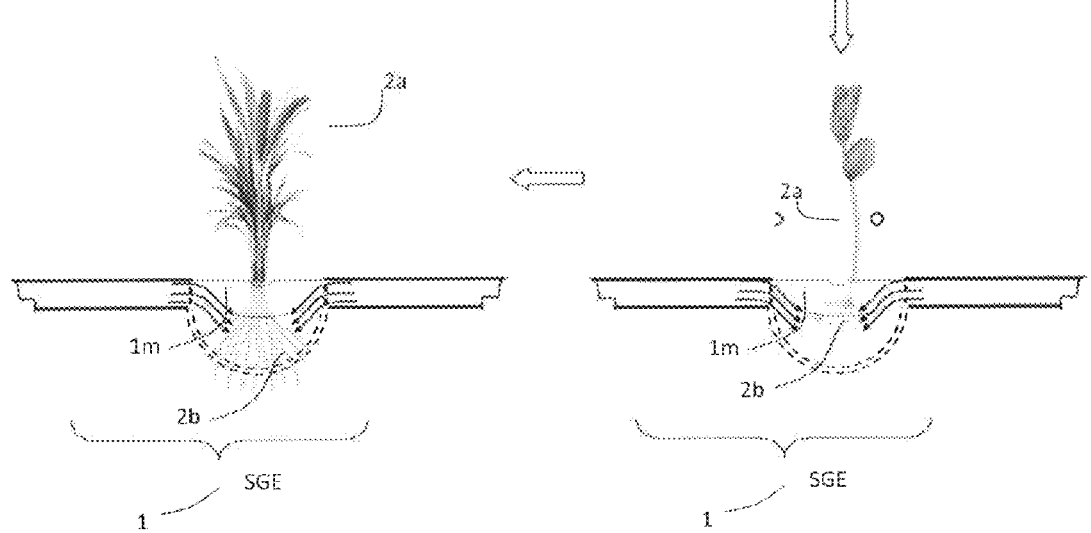
FIG. 4E    FIG. 4F
FIG. 4H    FIG. 4G

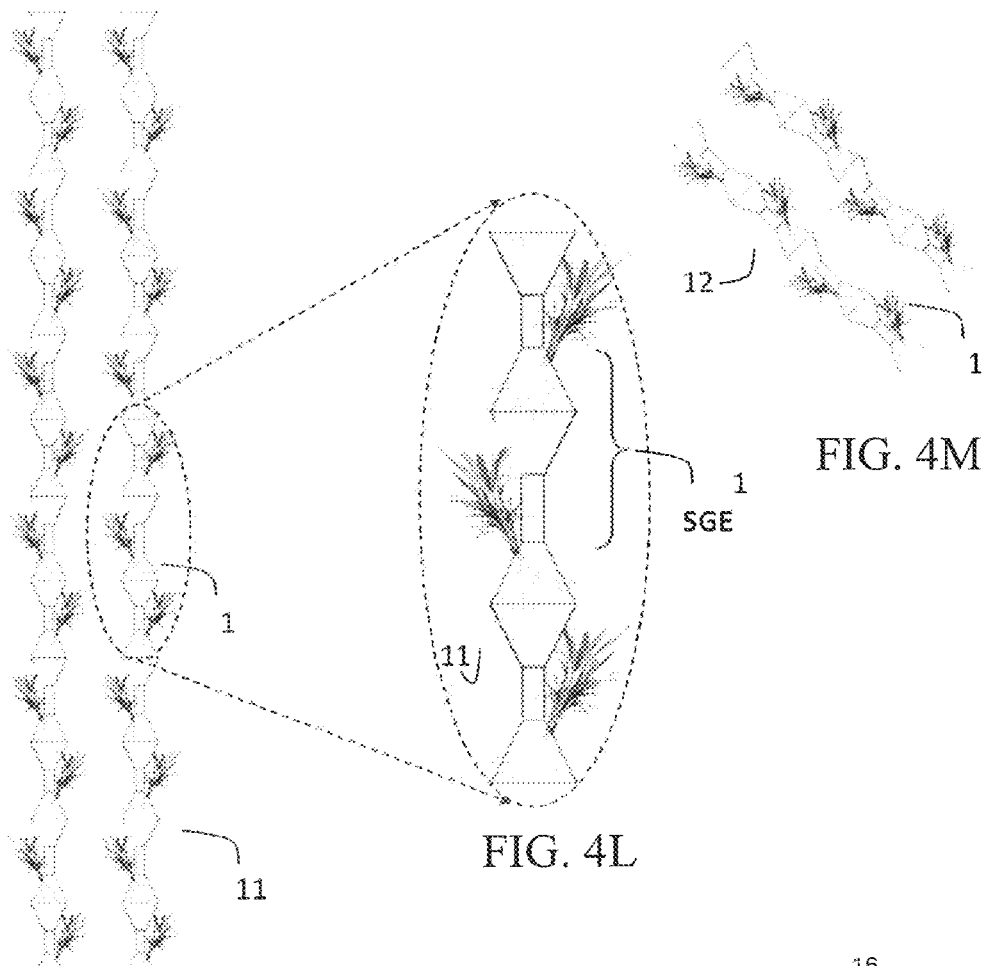
FIG. 4M
FIG. 4L
FIG. 4K
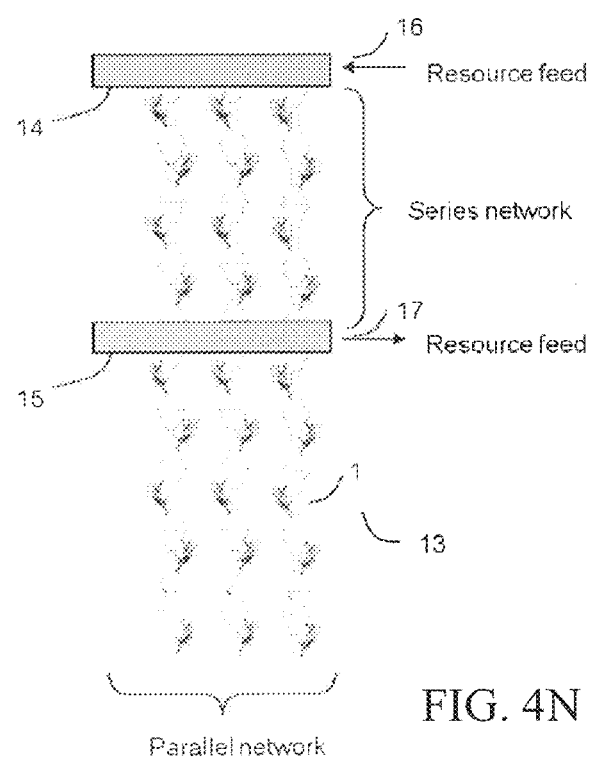
FIG. 4N

SANSSOIL (SOIL-LESS) INDOOR FARMING FOR FOOD AND ENERGY PRODUCTION

RELATED APPLICATIONS

Not applicable.

BACKGROUND OF THE INVENTION

Field of the Invention

This invention is related to the field of agriculture, horticulture, agronomy and agro-economics of food, energy, and other organism made substances. It is specifically related to the understanding, and optimizing plant, yields, photosynthetic energy conversion efficiency as well as the utilization efficiencies of other resources, including, time, space, water, and nutrients. Even more specifically, the invention is related to indoor, environmental controlled farming in three dimensional spaces, without the reliance of the sun energy or soil. The invention also addresses the need to solve problems associative with conventional outdoor two dimensional farming which is projected to limit its ability to achieve food and energy security for humanity.

Will We Produce Enough Food to Adequately Feed the World?

Advances in health sciences and technologies, in combination with better nutrition, are paving the path to nearly eradicate infant mortality while increasing life spans to beyond the present average of 80 years. Consequently, it is expected that the world population will swell to at least 9 billion by 2050. It has been recognized that such a level of projected population increase will pose a formidable challenges to our planet, stressing its already limited resources: food, energy, land, and water, and fomenting competition to obtain and sustain good quality of life and lifestyle for all.

These challenges have recently been highlighted by the United Nations' Food and Agriculture Organization, FAO, which published the findings of a High Level Experts Forum, in Rome, Oct. 12-13, 2009, entitled "How to Feed the World 2050". Also in the Jun. 15, 2011 Issue, CO2-Science, published by the Center for the Study of Carbon Dioxide and Global Change, Dr. C. D. Idso, highlighted the challenges in his article entitled "Estimates of Global Food Production in the Year 2050: Will We Produce Enough to Adequately Feed the World?"

Both the FAO and Idso reports reveal an alarming consensus: that a significant per capita reduction is looming, in global food production, arable land, water resources, and farm yields of staple food crops. To avoid the disastrous consequences, they point to the need for a radical paradigm shift in food production technologies, systems and methods. The present food supply-demand gap continues to have devastating consequences in many parts of the world, in the forms of hunger, mal-nutrition, and deaths. The projected widening of that gap will worsen by 2050 for a 9 billion population. In addition to famine in many parts of the world, geopolitical strife will also cause incalculable adverse effects on the welfare of humanity.

These challenges are further magnified by the following three conflicts:

Conflict #1: Food vs. Less CO2

There are many who are concerned over global warming caused by carbon dioxide emissions. They have embraced the cause of curbing fossil fuel use and are advocating CO2 reduction measures, and urging governments. They have influenced certain governments to act, and laws have been enacted attempting to discourage the use of resources that increase global CO2. However, this position is in direct conflict with the need to sustain life and to feed the world, as a first priority. At present, 1 billion hungry people need urgent attention, growing to be 3-4 billion in 2050. It is puzzling contradiction that the "global warming" community relies of questionable photosynthesis models to predict dire consequences for humanity in 2100, yet they cannot use the same models to understand why plant food efficiency is <0.5% (Table 1). The full and accurate understanding may very well prove that more CO2 is better at absorbing heat and at the same time deals with today's urgent need for food and biofuel. After all, CO2 is the main ingredient for food and life itself (living mass is hydrocarbon matter).

Conflict #2: Food vs. Fuel

Direct consequences of the global warming mitigation are the mandates imposed by the US and EU and other countries to produce CO2 neutral transportation fuel from biomass, biofuel. This presents yet a second conflict with the priority of feeding the world. It is feared by many that biofuel exacerbates the problem by diverting already scarce resources normally dedicated to food production: arable land, water, seeds, fertilizers, herbicides, farming tools. The food and energy price pressures that ensue will make it even harder for many vulnerable segment of the global population to close the nutrition gap. It is feared that their numbers will increase. It is also in conflict with achieving both food and energy security. This food vs. fuel debate continues unabated: http://en.wikipedia.org/wiki/Food_vs._fuel.

Conflict #3: Food vs. Forest Land

As shown in Table 1, (http://arpa-e.energy.gov/Portals/0/Documents/ConferencesAndEvents/PastWorkshops/ABTF%20Workshop%20 %20Ort%20Presentation.pdf) plant scientists, and agronomists agree that the measured efficiency is ~0.5%, however, they cannot fully account for all the ~99.5% losses, i.e., the where these losses originate. As described below in more details, in connection with the present invention, the full accounting for these losses is the key to inventing ways to minimize them.

The plants store solar energy in the form molecular bond energies of carbohydrates, sugars, starches, cellulose and proteins. The economics of conventional farming to profitably produce staple foods (sugars, cereal grains, legumes, leafy vegetable, and tubers such as: potato, yams, cassava) that consumers can afford, relies directly on the zero cost of solar energy, ZCOE. This forces cultivation outdoors, on two dimensional lands, because the solar radiation is delivered in units of Watt per unit area (hectares, acres, or square meters).

The reliance on this ZCOE has therefore, forced conventional agronomy succumb to accepting ~0.1 to 0.5% efficiencies (see Table 1). One of the main factors leading to such low efficiency is the need to use the soil to support plant growth, and soil borne nutrients which are not easily controlled. As will be shown below, the soil is not an asset. In addition, the reliance of ZCOE, meant accepting the adverse environmental conditions by seeking appropriate hospitable geographical locations that supply water, solar radiation and tolerable temperature swings.

Therefore, because of the reliance on ZCOE, the growers, and the food production enterprises, have limited or no control. This in turn has lead to the requirement of enormous resources that are inefficiently used, including: insatiable demand for two dimensional arable land, water, fertilizers, and pesticides. To accommodate the population increase from 1 billion in 1800 to the present, ~7 billion, required deforestation at a high rate. On a global scale, once again fearing that deforestation adversely impacts the issue of global warming, governments are enacting laws and mandates to restrict increasing farm land by deforestation. This is the third conflict with the priority to feed the world, and achieving energy security.

TABLE 1

Efficiencies of selected crops
Annual solar energy conversion efficiencies of C3 and C4 agricultural crops.

| Crop | Type | Yield t ha$^{-1}$y$^{-1}$ | Efficiency (%) |
|---|---|---|---|
| Elephant grass | *Pennistum purpureum* | C4 | 88 | 0.8 |
| Sugar cane | *saccharum officinarum* | C4 | 66 | 0.6 |
| corn | *zea mays* | C4 | 27 | 0.4 |
| beet | *beta vulgaris* | C3 | 32 | 0.5 |
| rye | *lolium perenne* | C3 | 23 | 1.7 |
| potato | *solanum tuberosum* | C3 | 11 | 0.3 |
| Wheat | *triticum aestivum* | C3 | 12 | 0.2 |

OBJECT AND SUMMARY OF THE INVENTION

In view of the above, the reliance on the sun has one asset, which is ZCOE. However ever it has many liabilities. There is therefore a need to resolve the above conflicts in order to achieve both food and energy security for humanity. One means of achieving this, which is one of the objects of the present invention, is teaching radical inventive farming methods that eliminate the lack of control of outdoor farming by abandoning the ZCOE dependence and its associated use of soil related liabilities, as well as scarce arable and two dimensional lands.

In the present application, we use the term SanSSoil that is defined as an enclosed indoor farming method that eliminates the need for soil. In many SanSSoil embodiments, the sun is also optionally eliminated as the main light source for photosynthesis. In other SanSSoil embodiments, the sun may be used alone or in combination with artificial lights. In many SanSSoil embodiments, three dimensional architectures are found to be most advantageous. The use of the third dimension enables the productivity metric of yield per cubic meter to be used, and the means to maximize it are sought, leading to minimum use of land area.

More specifically, the inventive solutions presented herein, have been inspired by Applicant discovery of mathematical analytic expression, referred to as AgriPAL (agriculture profitability assurance law), which gives deep insight, for the first time, as to why conventional outdoor farming has been profitable since its invention ca 10,000 ago. This insight afforded by AgriPAL, to date, has been opaque to plant scientists and agronomists. It makes transparent the relationship between the plant yield, the physiological efficiencies of resource utilization and their direct impact on the economic viability of food and biofuel producing enterprise. Even more specifically, the discovery of a solar gain factor $g_{sol}$, which together with the physiological energy conversion efficiency, $\eta_E$ reveal the economic viability index, $EVI=\eta_E g_{sol}$ which must approach or exceed the value of 1, in order to achieve profitability.

The key insight is what happens in indoor farming, when artificial lighting is used, and we must pay for the energy. In this case, $g_{sol} \rightarrow 1$ and $EVI \rightarrow \eta_E$ which is such a low value taken from Table 1 making indoor not economically viable from many crops, especially staple crops and bio-fuels. The present invention solves this problem, by teaching (thanks to AgriPAL) how to obtain another gain factor, $g_e$, (substitute for $g_{sol}$), in the absence of the sun ($g_{sol} \rightarrow 1$) that leads to an enhanced viability index: $EVI^e \equiv \eta_E g_e$. This, according to the many aspects of the present invention, makes $EVI^e \equiv \eta_E g_e \rightarrow 1$, thereby ensuring profitability for indoor (sun-less, soilless) farming even for staple food and biofuels.

The knowledge gained from Applicant's AgriPAL leads to:

1. Abandoning the sun and the soil and uncontrollable outdoor farming.
2. Adopting inventive controlled environment indoor SanSSoil architectures.
3. Proof that the novel SanSSoil architectures can be economically viable, $EVI^e \equiv \eta_E g_e \rightarrow 1$.
4. Said architectures are naturally suited to three dimensional environments, since the sun is no longer relevant.
5. The sky now is the limit; arable land is no longer a problem.
6. Therefore, since competition between food and biofuel for land, both food and energy security are achievable without the above three conflicts.

BRIEF DESCRIPTION OF THE DRAWINGS

The following drawings are intended to describe the preferred embodiments and operating principles. They are not intended to be restrictive or limiting as to sizes, scales, shapes or presence or absence of certain necessary components that are not shown for brevity but are, nonetheless, well known to those skilled in the art.

FIGS. 3F-3K describe how SGE are interconnected into strings, which in trun from layers of plurality of strings all networked to from a 3D growing system 1.

FIGS. 4A-4H describe the integrally made single SGE and its commutations with its neighbors sharing resources: light and nutrients to support growth.

FIGS. 4I-4M describe the integrally SGE and SGE strings assuming growth plants in various orientations.

FIG. 4N illustrates the possibility that strings of SGE may interconnected into series and parallel network combinations in communication with resource supply sources.

DESCRIPTION OF THE PREFERRED EMBODIMENTS

I. Need for Sound Scientific Fundamentals

Figure 1A:
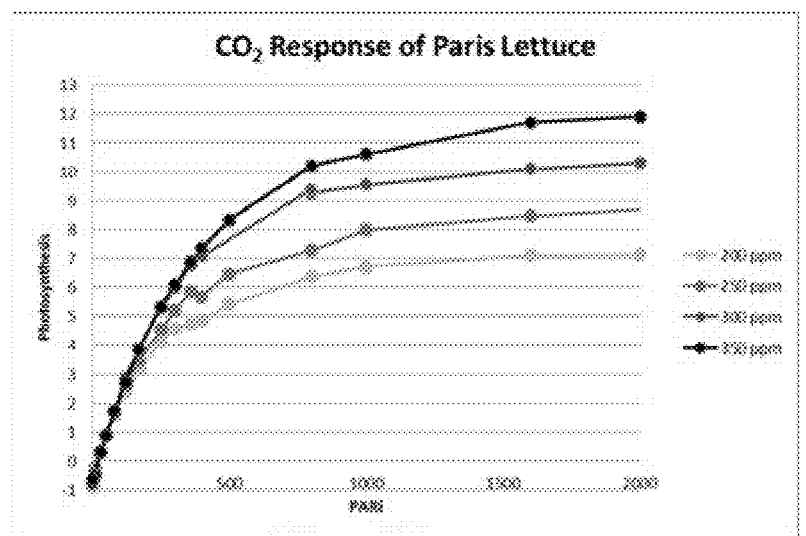
FIGS. 1A-1C show experimental photosynthetic response of two lettuce varieties and strawberry plants to the variation of light intensity, PAR, and carbon dioxide levels. These reveal the saturating or limit level phenomena of the inputs.

Relying on the status quo, the above three conflicting debates are not winnable. The main reason is that they are based lack of or at best, they are based incomplete fundamental scientific and economic understanding of the food enterprise. An exemplary evidence to support this conclusion is gleaned from this quote: "Farming is not a money-making proposition in an industrial economy. Never was, never will be." By: Gene Logsdon, a veteran expert in the field agronomy, and the author of 20 books, and numerous publications. http://www.landinstitute.org/vnews/display.v/ART/2002/06/21/3d1a6b900f801.

Of course, it is evident that his position on the viability of the farming enterprise is not supported by the facts; more that 10,000 years of food production that sustained human population growth.

Another example is found in the article entitled: "Diagnosing a Farm Profitability Problem", http://www.uaex.edu/Other_Areas/publications/PDF/FSA-9512.pdf. The author deals with nearly every conceivable parameter, except those which deal with the physiological efficiency of the plant, and the role ZCOE of the sun plays in the profitability. Imagine diagnosing a patient without the knowledge of the patient's physiology!

In their report NREL/TP-580-24190, entitled "A Look Back at the U.S. Department of Energy's Aquatic Species Program—Biodiesel from Algae", http://www.nrel.gov/docs/legosti/fy98/24190.pdf, Sheehan, et al., present an extensive expert assessment of farming and harvesting algae for bio-fuel, and specifically present deep science-based discussions of the impact of the photosynthetic solar energy conversion efficiency. They point to the fact: "Not enough is understood about what the theoretical limits of solar energy conversion are."

Yet anther report related to the photosynthetic efficiency and productivity of algae cultivation entitled "A Realistic Technology and Engineering Assessment of Algae Biofuel Production", http://digitalcommons.calpoly.edu/cgi/viewcontent.cgi?article=1189&context=cenv_fac , Lundquist et al., conclude: "Unfortunately, much of the current interest in algae oil production is based on a lack of understanding of the science underpinning this technology, and on a misreading, or lack of reading, of the prior technical reports."

More specifically, as will be shown infra and in Sections II and III, there has not been a credible attempt to fundamentally understand energy conversions efficiencies and utilization efficiencies of other resources, including: water, space, time, CO2 and primary and secondary and trace micronutrients. The most scientifically advanced credible attempts (discussed below) are unable to fully and accurately account for all the 99.5%-99.9% plant losses (Table 1). Gaining full understanding will be the enabling catalyst that achieves inventive engineering solutions to realize the "feed the world" mission while resolving the above conflicts. By simply increasing the average global efficiency to 1%, will double the yield per hectare of staple food. This path will produce enough food to adequately feed the world and enough biofuel to energize the world, thereby achieving both food and energy security for inhabitants of the planet, not just rich and powerful.

I.1 Known Scientific and Technological Facts

From a scientific perspective, giving the proper nutrition resources, plants will grow reproduce and propagate and proliferate. They are indifferent as to how these resources are delivered to the plants or where they came from. It is now an established fact that plants can grow indoors by means of modern controlled environment agriculture, CEA, methods. The adoption of CEA is accelerating, in view of its numerous benefits including: increased yield, pest elimination, lower water demand, lower nutritional demand, and species specific nutrient recipes. It has also been established that, in advanced CEA, plants thrive under artificial light, with soilless, SanSSoil, aeroponic feeding techniques.

Therefore, from established fundamental scientific facts, neither sun nor soil are exclusively required for growing food, leading to the logical conclusion that arable land should no longer be the limiting resource. In other words, there are alternatives to the sun and soil. We can grow anywhere, including in the third dimension where space is unlimited. In indoor 3D CEA farming edifices, which can be sealed, water molecules are not allowed to escape. The water produced by the transpiration process can be condensed and recycled, which results in water savings of at least 100 times relative to conventional outdoor 2 D farming.

Plants grow photosynthetically by converting light photons mostly into hydrocarbons. The building block (simplest) of hydrocarbon is glucose sugar which has the chemical formula $(CH_2O)_6$. Based on the law of mass conservation; the plant requires only 6 water molecules $H_2O$ and 6 carbon dioxide molecules $CO_2$ to produce one glucose molecule. In addition, each cell has a water content of 60-80% of dry weight. It is possible to recycle all the water that is not stored part of the dry biomass. Therefore, using a totally sealed environment, the water requirement for farming can be reduced by at least two orders of magnitudes.

Water availability, therefore, is not the limiting factor. Therefore with sealed indoor farming, we have a great opportunity to grow food everywhere, including in the most arid lands and deserts, provided a small amount of water is used most efficiently.

Based on energy conservation laws, it has been established that for every $CO_2$ molecule is assimilated by the plant, about 10 to 12 photons are required from the light source. The plant light harvesting machinery has evolved to its present optimized capability. This optimization is stored in the genome of the plant as certain genes which perform "evolutionarily conserved" functions through out the plant kingdom. This function is the same whether the organism is a single cell algae, sugar cane, or giant red wood tree. This function has been optimized around the selective spectral absorption of the chlorophyll molecules. Although, these molecules, and the plants can thrive in light near the blue region of the spectrum, ~400 nm and near red ~680 nm, they do not necessarily need the blue energy.

This reveals how much energy is squandered by farming outdoor, relying on solar radiation. It also presents an opportunity, according to aspects of this invention, for indoor "sun-less" farming using only a single wavelength chosen from a low cost highly efficient source, including light emitting diode, LED, that gives a narrow light band near 650 nm. Of course a blue LED can be used but that will be wasteful and costly. At present, plant investigators are debating the role of blue radiation for indoor farming.

I.2 the Premises of the Present Invention

First Premise: Facts

The conclusions based on the above fundamental scientific and technological facts are summarized as follows:
1. The sun is not necessary, artificial light is a viable alternative.
2. The Soil is not necessary. Plants have been shown to grow anywhere including zero gravity outer space.
3. Only 6 water molecules for every glucose sugar unit, makes water not limiting, especially when water recycling means are used. This is a great opportunity to save water,
4. Indoor faming is more efficient and better controlled than outdoor farming especially avoidance of pests.
5. Food and biofuel energy security are achievable, resolving the above three conflicts.

Second Premise: The Discovery of Farming Profitability and Economic Viability

While the conclusions 1-4 above are based on scientific, engineering measureable facts, the conclusion 5, however, lacks the agronomic or agro-economic support. More specifically, the realization of conclusion 5 must satisfy economic viability (profitability) conditions which have made conventional solar-based outdoor farming profitable, since its invention, ~10,000 years ago. This success economic viability success has been responsible for sustaining human life and population growth to the present ~7 billion.

However, there has not been a quantitative analytical definition of the economic viability index, EVI, that comprises measurable parameters and the predictive power to determine what makes a farming enterprise viable (profitable). If existed, it would enable the decision much easier, to launch a new enterprise, improve and expand exiting ones, or even to disband those that are not viable. This is especially true in the burgeoning field of algae based bio-fuels (also called third generation biofuel). The obstacle encountered in formulating the EVI, has been the difficulty in accounting for solar energy that comes freely with no cost, ZCOE. Because of this ambiguity, it is believed that many biofuel start-up companies had to liquidate, and many others, at present, are hoping to survive on the basis of claims that are not supportable.

Applicant research and analysis have concluded that the absence of EVI that accounts for the ZCOE, the reason for the absence of a viable plant growth models. Such model would explicitly quantify farming productivity, relate it to intrinsic energy conversion efficiency, as well as physiological aspects of plant growth, and explicitly accounts for the absorbed solar energy. The inability to account for the ZCOE of the sun has resulted in the lack of transparency of EVI and is believed to hinder better understanding of agro-economics of farming. The inability to account for the ZCOE has also hindered progress to resolve the above three conflicts, which would have paved the way to realize the mission of food and energy security.

Therefore, in order to clarify why outdoor farming has been viable for so many years, Applicant has succeeded in formulating an agro-economic law called: Agriculture Profitability Assurance Law, AgriPAL described by this mathematical expression (Section II):

The economic viability index, EVI, is defined as:

$$EVI \equiv \eta_E \left(\frac{\varepsilon_{sol}}{\varepsilon_{other}}\right) = \eta_E g_{solar}.$$

The second premise of the present invention is based on Eq. (2), and embodies an inventive method that enables the linking, of the economic parameters, profit, p, fixed cost, f, variable cost, v, to the organism (plant, algae, other photographs) energy conversion efficiency, $\eta_E$, including a gain factor, $$g_{solar} = \left(\frac{\varepsilon_{sol}}{\varepsilon_{other}}\right),$$

wherein, $\varepsilon_{sol}$, is the solar energy consumed per cycle and, $\varepsilon_{other}$, all other energies consumed. If the latter incorporates f+v energy equivalents, then Eq. (2) becomes:

$$\eta_E \left(\frac{\varepsilon_{sol}}{\varepsilon_{other}}\right) \frac{\overline{ROE}}{\overline{COE}} \geq (1+p).$$

The value of this conversion efficiency parameter, $\eta_E$, is not only species dependent, but also variety (cultivar) dependant. Each cultivar is optimized by breeding and propagation methods to exhibit desirable traits for specific geographical locations, and regional soil conditions. The growers, however, have no control over this outdoor parameter $\eta_E$, once they purchase the seeds (embryos) suitable for their location and environment.

Over the years breeders, plant scientists, and agronomists have succeeded in increasing $\eta_E$ by about 20 times in the case of staple food. The Green Revolution of the 50's and 60's is attributed to this success. It staved starvation in many countries. The increases in $\eta_E$ provided profitability assurance, and made many countries food self sufficient, including: the USA, Mexico and India.

Unfortunately, increases in $\eta_E$ have slowed to a halt, triggering the alarming dire predictions related to our ability to feed the world in 2050. Optimistically, breeders, plant scientists and agronomists, are using modem tools to reverse the trends and to increase $\eta_E$. Tools used include: Faster, cheaper genome sequencing, bio-engineered organisms that exhibit novel desirable traits encoded in their transformed genomes, plant cell culture, and accelerated breeding though double haploid technology to produce stable pure breeds.

Applicant's AgriPAL is another contribution which links the physiological aspects of $\eta_E$ to the economic viability index for outdoor farming. It has enabled Applicant to teach herein several inventive embodiments related indoor farming which emulate the economic viability of outdoor farming as clarified by AgriPAL formula.

AgriPAL explicitly reveals EVI as the quantity: $\eta_E g_{solar}$, with $g_{sol}$ as the solar gain, without which, farming is not profitable. It requires that $\eta_E g_{solar}$ approach or exist 1, so that the condition in Eq. (2) is satisfied. Applicant derivation of the new AgriPAL reveals transparently, unambiguously, and explicitly, for the first time, role the sun plays in an agronomic formula even though the cost associated with solar energy is zero. It also enables the accurate accounting of all other energy sources, $\epsilon_{other}$, which include, hydrocarbon, electrical, mechanical, and chemical sources.

This second premise of the invention is the method that made EVI transparent and explicit. It revealed for the first time, that even though the energy efficiency can be as low as 0.005 or even as low as 0.001 (table 1), EVI as whole can approach the value of 1 and may even exceed 1, because $g_{sol} \gg 1$, enabling the profitability condition in Eq. (2) to be satisfied. The solar gain factor $g_{sol}$ may exceed 1000, since it is possible to realize in certain situations $\epsilon_{other}$ to be very small, or even vanishingly small.

The ability for the first time to understand and quantitatively and explicitly account for why conventional outdoor solar-based farming has been economically viable (profitable) for millennia is the only path to replicating said economic viability of indoor farming with artificial lighting, in the absence of the sun, according to inventive aspects of the present invention. More specifically, the realization of the conclusions 1-5 of the first premise now becomes possible as a result of the full understanding of the agronomic factors afforded by AgriPAL Eq. (2).

Third Premise: Indoor Farming Profitability and Viability

This is related to combining conclusions 1-5 of the first premise with the knowledge of EVI and its connection to the agronomic parameters, of AgriPAL, Eq. (2) from the second premise. More specifically, using AgriPAL, to enable the establishment of an economically viable indoor (sun-less) food production enterprise, based on artificial lighting. The success of this indoor enterprise emulates or modeled after the already proven viability outdoor farming that enjoys zero solar energy cost.

The combination of conclusion 1-5 with AgriPAL paves the way to the practical and profitable realization of indoor farming for food and energy security mission, without the three conflicts. This is the third premise, the third piece of the puzzle needed to achieve that mission, by methods and means inventive indoor farming (for staple and other foods), according to the present invention. Such indoor methods and means emulate the profitability and success of conventional solar energy-based outdoor farming, for affordable staple food production, according to the following logical sequence:

a. Set $\epsilon_{sol}=0$, so that EVI→$\eta_E$ which is the ratio of output energy divided by the input energy repressible for photosynthesis, wherein $\eta_E$ is for a cultivar bred for outdoors.

b. When $\epsilon_{sol}=0$, the condition, $$\eta_E \frac{\overline{ROE}}{\overline{COE}} \geq (1 + p + f + v)$$

is impossible to be satisfied (non economically variable) for indoor farming of commodity staple foods, because $$\eta_E \frac{\overline{ROE}}{\overline{COE}} \sim (0.005) \times (2)$$

is clearly much less than 1, from Table 1.

c. Must provide a means to produce a gain factor $g_e$ for indoor farming that emulates the role $g_{sol}$ plays in outdoor farming, such that the union of this new gain factor $g_e$ and $\eta_E$ will satisfy the new condition $$g_e \eta_E \frac{\overline{ROE}}{\overline{COE}} \geq (1 + p + f + v).$$

d. Embark on research and analysis that will make the physiological and physical components $\eta_E$ more transparent, so as to enable us to fully account for all the losses and the bottle necks and invent means and methods to transform and enhance $\eta_E$, to become $\eta_E^e \equiv g_e \eta_E \equiv EVI^e$.

e. Find inventive methods and systems that lead to an enhanced energy conversion efficiency $\eta_E^e > \eta_E$ for cultivars bred for indoors, with an enhancement factor or gain factor defined by: $\eta_E^e = g_e \eta_E = EVI^e$, the enhanced economic viability index $EVI^e$.

f. With the new $\eta_E^e \equiv g_e \eta_E \equiv EVI^e$, determine which organism cultivar (micro-organism strain) and growing system, that satisfy the AgriPAL condition:

$$EVI^e \frac{\overline{ROE}}{\overline{COE}} \geq (1 + p + f + v),$$

and realizing the highest profit margins g. Finally, determine the minimum value of $g_e \eta_E$ that enables the profitability assurance of farming commodity staple foods and bio-fuels derived from them.

h. With step g satisfied, the mission to produce all foods and bio-fuels with no competition, according to conclusions 1-5 of the first premise, is now accomplished.

The third piece of the puzzle, the third premise, is predicated on the successful ability to achieve step d:

Embark on research and analysis that will make the physiological and physical components $\eta_E$ more transparent, so as to enable us to fully account for all the losses and the bottle necks and invent means and methods to transform and enhance $\eta_E$, to become $\eta_E^e \equiv g_e \eta_E \equiv EVI^e$. This is one of the key aspects of the present invention.

This has become necessary because of the failure of prior art teaching (as shown the fourth premise below) in the full understanding and accurate accounting for all the 99.5% losses (Table 1) and its inability to relate these losses to all the physiological and physical components responsible for the growth mechanism. Therefore, this would make it possible to invent means and methods to achieve $\eta_E^e \equiv g_e \eta_E \equiv EVI^e$ necessary for profitable indoor farming and for obeying the AgriPAL condition, according to the present invention.

Note the distinction in notation:

Parameters in, $\eta_E^e \equiv g_e \eta_E \equiv EVI^e$, that have small "e" refer to the enhancement required for indoor farming according to the present invention that satisfy the AgriPAL viability condition.

Parameters in, $\eta_E g_{sol} \equiv EVI$, without the small "e" pertain to conventional outdoor cultivars that are un-enhanced and have exemplary values in Table 1.

Fourth Premise: Prior Art Model Limitations

The state of the art level of scientific understanding of plant efficiency is highlighted in a recent article entitled "Improving Photosynthetic Efficiency for Greater Yield" by Zhu, et al, Annu. Rev. Plant Biol. 2010. 61:235-61. This, to date, is the most extensive treatment addressing the yield from the point of view genetic traits of plants which have been improved by ever improving breeding methods including genetically engineered organism with improved stress (water, hear, pathogens) tolerance. Since the genetic trait-based yield increases have slowed considerably, the authors point to need to investigate the physiological photosynthetic efficiency, the enzymatic biosynthetic factors, as the most promising path to resume the increase of productivity.

The authors describe the yield by the following equation:

$$Y = 0.487 \cdot S_t \cdot \epsilon_i \cdot \epsilon_c \cdot \epsilon_p \tag{1}$$

Where, St (GJ m−2) is the total incident solar radiation across the growing season, $\epsilon_i$ is the light interception efficiency, $\epsilon_c$ is the conversion efficiency, and $\epsilon_p$ is the partitioning efficiency also termed harvest index, is the amount of the total biomass energy partitioned into the harvested portion of the crop. The authors also reveal that this equation does not match the yields observed in the field. In fact deviations between theoretical potential and average experimental observations, of 500% and 6500% for C4 and C3 plants respectively discussed in the following references: (http://arpa-e.energy.gov/Portals/0/Documents/ConferencesAndEvents/PastWorkshops/ABTF%20Workshop%20-%20Ort%20Presentation.pdf) and http://www.sebiology.org/education/slides/Lancaster/Neil_Baker.pdf In addition to the theoretical and experimental deviations, prior art models which describe the conversion efficiency $\epsilon_c$, do not offer explicitly and sufficiently detailed transparency of the basic physiological aspects of plants. Specifically, they do not account for temporal information that is inherent a dynamical growing system that comprises a plurality of dynamic subsystems including: several enzymatic biosynthetic reactions that lead to cellular doubling, building all the machinery necessary for absorbing energy, converting and storing energy, and reacting to environmental stimuli and stresses in a manner that ensures survival of the organism. Many of theses kinetic functions take place in sub-millisecond time scale, while others take longer times ranging from seconds to hours.

While it is recognized that it takes 10-12 photons to assimilate one CO2 molecule, this happens at very low light level, far away from the saturating intensity. Near or above this saturating intensity, losses increase significantly. As shown below, Applicant discovered that these losses are related to the temporal mismatch between the fast reactions PS II & PS I and the slow Calvin (Rubisco). Applicant measured these losses to be between 4 and 9 and reclaimed as gain in aspects of the present invention.

Therefore, in view of the above limitations of prior art energy efficiency models, there is an urgent need for an alternative working model that better reveals, more transparently, the plurality of the basics components of the organism, that the accounts more accurately for the losses experienced by plant systems.

More specifically, the new model must be able to achieve step d of the third premise in order to successfully emulate the profitability success of solar-based outdoor farming. Even more specifically, the new model should enable to accurately measure the temporal and spatial aspects of the organism. Such an accurate model will enable scientists and engineers to provide innovative systems and methods that improve plant productivity, and ensure both food and energy security to do away with the "food or fuel" conflict.

Fifth Premise: Inventive Plant Growth Model, PGM

According to step d of the third premise, seeking an inventive method and means to emulate the profitability success of conventional solar energy-based outdoor farming requires the an enhanced energy conversion efficiency, $\eta_E^e > \eta_E$ be realized, with an enhancement factor or gain factor defined by: $\eta_E^e \equiv g_e \eta_E \equiv EVI^e$. Prior art teaching according to Eq. (1) does not reveal the requisite physiological transparency that even hints at the possibility of achieving a gain factor $g_e > 1$.

The fifth premise, therefore, is Applicant's Plant Growth Model, PGM, that has enough plant physiological details to enable engineers to conceive inventive farming methods and systems with $g_e > 1$. The detailed derivation of PGM and its agronomic applications are presented in Section III. The key inventive methods and means are embodied in the following equations:

$$\eta_E = \epsilon_d Y / \overline{P_{sat}} = [\epsilon_d G_{MB}(\infty)(1 - e^{-K\tau_{sth}})]/(\overline{P_{sat}} \tau_{sth})] \tag{4b}$$

and, the standard PGM form for outdoor solar based farming:

$$\eta_E = \xi \phi = \xi \prod_{i=1}^{n} S_i \tag{5}$$

$$\phi = \prod_{i=1}^{n} S_i = S_m S_I S_{II} S_{env} S_{Br} \ldots S_{photon} \tag{5a}$$

$$\xi = \xi_{sp} \xi_t \xi_f \tag{5b}$$

obeying the outdoor AgriPAL Condition:

$$\eta_E \left( \frac{\varepsilon_{sol}}{\varepsilon_{other}} \right) \frac{\overline{ROE}}{\overline{COE}} \geq (1 + p + f + v) \tag{2}$$

$$\text{with } EVI \equiv \eta_E \left( \frac{\varepsilon_{sol}}{\varepsilon_{other}} \right) = g_{sol} \eta_E,$$

and the enhanced PGM form, applicable to the inventive indoor farming according to the present invention:

$$\eta_E^e = g_e \eta_E = \xi^e \phi^e = \xi^e \prod_{i=1}^{n} S_i^e \tag{6}$$

$$\phi^e = g_\phi \phi = \prod_{i=1}^{n} g_i S_i = \prod_{i=1}^{n} g_i \prod_{i=1}^{n} S_i \tag{6a}$$

$$\xi^e = G_\xi \xi \tag{6b}$$

obeying the indoor AgriPAL Condition:

$$\eta_E^e \frac{\overline{ROE}}{\overline{COE}} \geq (1 + p + f + v) \tag{2b}$$

$$\text{with } EVI^e \equiv \eta_E^e \equiv g_e \eta_E$$

Where, $$\prod_{i=1}^{n} S_i$$

and the enhanced form $$\prod_{i=1}^{n} g_i S_i$$

represent those parameters, members or components which play functional role in the physiology of the organism, and Eq. (5a) groups the members of the sets $$S = \{S_1, S_2 \ldots S_n\} = \prod_{i=1}^{n} S_i \text{ and } g_e = \{g_1, g_2 \ldots g_n\} = \prod_{i=1}^{n} g_i$$

in, into related at least six groups including:
1. $S_m = S_{CO_2} S_{H_2O} S_{O_2}$
2. $S_I = S_N S_P S_K$:
3. $S_{II} = S_S S_{Ca} S_{Mg} S_{Mn} \ldots S_{Cu}$:
4. $S_{Br}$:
5. $S_{env} = S_{soil} S_{pH} S_T S_{weather} S_{pest}$
6. $S_{photon} = S_\lambda S_t S_{sp}$ and their corresponding respective enhancements groups from the set $g_e$.

One or more members of a group may be combined with members of one or more of the remaining groups to form a new group for the purpose of constructing a means and or method for achieving $\eta_E^e \equiv g_e \eta_E \equiv EVI^e$, with $g_e > 1$, in order to satisfy the profitability condition AgriPAL for the present inventive indoor farming. This affords many levels of control and the ability to obtain the necessary gain to satisfy Eq. (2).

The detailed functions and roles of members of the groups or subsets in plant physiology are given in more details in the form of non limiting examples in Section III. It is understood, that we may include other members or parameters that affect the physiology of the plant properties, including: taste, flavor, color, aroma, toxicity, medicinal or nutritional values. Others may be related to recombinant transformation of genomes permanently or transiently by means of introducing specific single genes or stacked genes (polygenes) that affect single or multiple traits, signaling or regulatory functions, resulting in the enhancement of $\eta_E^e \equiv g_e \eta_E \equiv EVI^e$, with $g_e > 1$. Yet others may include environments (x-ray, UV, viral etc.) to influence mutations, permanent or transient that may affect the enhancement $\eta_E^e \equiv g_e \eta_E \equiv EVI^e$, with $g_e > 1$.

As will be shown below, gain, $g_e > 1$, and more specifically the gains in ranges 2-5; 5-10; 10-100; and at least 100, may be obtained with the new means of controls, according to aspects of this invention. In certain aspects of the invention, enclosed indoor controlled environment is used with solar illumination such that a gain factor $g_e g_{solar}$ such that a hybrid $EVI^k = \eta_E g_e g_{solar}$ can be made to exceed 1, using solar illumination alone, artificial illumination alone, or a combination of the two. In either case, it is possible to employ methods and means to increase $$g_{sol} = \frac{\varepsilon_{sol}}{\varepsilon_{other}}$$

by decreasing $\epsilon_{other}$, the sum of all other direct energies plus energy equivalent of direct costs. The latter are computed by the dividing them by a reference COE. The energy equivalent direct costs so converted include components of f and v in Eq. (2), leaving only the indirect cost components of f and v in the right hand side of Eq. (2).

Using one or more of the components, in an appropriate combination, from the groups, $S_m, S_I, S_{II}, S_{env}, S_{Br} \ldots S_{photon}$, and $\xi_{sp}, \xi_t, \xi_f$, it will be shown in the present and co-pending applications that there are several means, methods and systems that lead to achieving $\eta_E^e \equiv g_e \eta_E \equiv EVI^e$, with $g_e > 1$ by means of enhancing one or more components from that group. It will be shown that $\eta_E^e \equiv g_e \eta_E \equiv EVI^e$, with $g_e > 1$, can be increased to a level as to satisfy the profitability, according to AgriPAL, of indoor farming systems with artificial lighting.

More specifically, the profitability of 3D multi-layer faming systems, with only few layers, that can achieve $g_e$ in the range of 5 to 10. Such an enhancement has been demonstrated experimentally by Applicant. In other embodiments, $g_e$, in the range of 10-100 can be derived from the enhanced group.

As will be shown below, gain, $g_e > 1$, and more specifically the gains in ranges 2-5; 5-10; 10-100; and at least 100, may be obtained with the new means of controls, according to aspects of this invention.

The laws of energy and mass conservation are strictly adhered to, that restrict $g_e \eta_E \equiv EVI^e$ to be less than one. There are many ways of increasing $g_e$ large values, but must always reach a limiting value (asymptote) such that the product $g_e \eta_E \equiv EVI^e$ may approach 1 but never exceeds 1. According to AgriPAL, $$\frac{ROE}{COE}$$

must always be larger than 1, to ensure profitability. This statement reveals that any enterprise that relies on converting light energy, and or biomass derived energy, must have $$\frac{ROE}{COE} > 1.$$

I.3 Food & Energy Security without Three Conflicts

The inventive embodiments of the present Application and related co-pending applications are based on the above five scientifically based premises. They afford deeper insight leading to a much improved understanding of the plant physiology, energy conversion efficiency and their relationship with temporal and spatial domains in the microscopic (micron, ms) and macroscopic (meters, hours days) scales. They provide transparency of the role each of plurality physiological parameters play, thereby, allowing engineers to identify and fix bottle necks in a focused manner.

This unprecedented knowledge is the source transformational departure form conventional thinking leading to the surprising inventive features of the present invention. More specifically, by persistently pursuing the accurate quantitative accounting for the loss mechanisms, 99.5%, surprisingly, led us to the conclusion that an improved farming method meeting the food and energy needs (staple commodities) for 9-10 billion people, must discard the old agronomic two dimensional, 2D, farming methods and its direct reliance on the zero cost of solar energy and soil based growth. This reliance, since 10,000 BC, constrained growers to succumb to its unintended limiting consequences, the liabilities of ZCOE.

Further more, the reliance on ZCOE and soil based outdoor farming, means uncontrolled farming, which we call "what-you-see is what-you-get, WYSWYG" farming. In this case, the farmer has no control over the key resources needed for the growth. More specifically, he has no control over the main ingredients: solar intensity, temperature, water, CO2 levels, soil minerals, extreme weather conditions or pests.

Instead, abandoning this traditional farming, leads to novel three dimensional, 3D, multilayer indoor farming which can be engineered to be efficient, and profitable even for the production of commodity staple foods.

In conventional 2D outdoor farming, the annual 2D yield (2D plant productivity) is measured in tons or kg per 2D area units (hectare, acre, or m2). Whereas, the 3D yield (3D volumetric productivity) is measured in units of kg per m3.

More specifically, discarding or departing radically from old agronomic 2D farming, the new inventive model, systems and methods, eliminate the reliance on the four most important pillars of farming:

The sun is eliminated as the main source of direct plant energy

Soil is eliminated as the medium for growing plants

Requirements of farming geography with ample of water no longer valid

Profitability requires cultivating minimum land area about 250 hectares, in agronomically advanced regions.

It is shown that when one is no longer bound by the above four pillars of farming, totally new inventive engineering solutions become possible. The direct consequence of this departure is increasing plant productivity by more than 10 fold, thereby, achieving both food and energy security while resolving the three contradictory conflicts.

The consequences of adopting a new mindset of 3D indoor farming with no sun, and no soil, and 3D metrics, are the following surprising conclusions:

1. Sugar cane is the most farmed food, representing 21% of all farmed products. It has an annual 2D yield of ~80 ton/hectare, with ~10% sugar content, and grows to a height of 4 meters. Sugar beet has average 2D yields of 50 ton/hectare, with ~25% sugar content, and grows to a height of 0.8 meter. By converting 2D to 3D yields, is evident that sugar beet has a much higher productivity than sugar cane as found from: $[(0.25)(50/0.8)]/[(0.1)(80/4)]=7.8$. Surprisingly, this overturns the previous wisdom that sugarcane is the most productive plant for ethanol biofuel.

2. According to the present invention, the indoor 3D farming of sugar beet is energy efficient and profitable, then multi-layer 3D farming with 10 to 100 layers produces sugar for food and fermented into ethanol biofuel, without infringing on additional land. This alleviates the concern over more deforestation and resolving the food vs. fuel dilemma.

3. By exploiting the third dimension for multi-layer (skyscraper) farming, there will no longer be a limitation of arable land to feed the world or to produce biofuel to energize the world.

4. With 3D indoor farming, because it can be made sealed from the outside world, the water requirement is reduced by least two orders of magnitude.

Therefore, the new farming paradigm, according to the present invention, focuses on mathematical analysis, and better fundamental scientific understanding of plant efficiency, and accounting relatively more accurately for the losses.

II. Agriculture Profitability Assurance Law, AgriPAL

Humans invented farming circa 10,000 BC, transforming their lifestyles from, hunter-gatherers, to settlers in farms, villages and towns. Farming was primitive. It was based on manual labor, assisted by animals and primitive tools. Farm productivity, yield, was low until the $19^{th}$ century innovations introduced in England, benefiting from the Industrial Revolution, that increases in yield were realized. Innovative farm tools and machineries, as well as chemical fertilizers, are among the key contributors to better farm productivity.

The evidence that farming has been profitable is supported by the fact it sustained population growth to the present level. This conclusion applies to the smallest family farm and the largest farms measured in hundreds and even thousands hectares. However, many farmers, economics, agro-economic scholars, scientists and accountant continue to debate productivity and profitability using primitive concepts and tools. The simplest tool is the spread sheet model that subtracts all the costs from the revenues of all farm products, to arrive at the profit. Attempts have been made to model profitability by means of mathematical analytical tools. Since farming depends on the geography, country and its farm policies, the models are applicable locally.

The following are exemplary prior art references dealing with farm productivity and profitability model.

http://www.ajol.info/index.php/wsa/article/viewFile/72847/61753 http://agecon.ucdavis.edu/people/faculty/j.%20edward-taylor/docs/REHO17-02.pdf http://ageconsearch.umn.edu/bitstream/117713/2/dennis%20Kinambuga%20Thesis.pdf http://ageconsearch.umn.edu/bitstream/125070/2/Chudleigh.pdf http://peer.ccsd.cnrs.fr/docs/00/58/19/75/PDF/PEER_stage2_10.1080%252F00036840600707209.pdf http://www.irec.org.au/farmer_f/pdf_170/The%20effect%20of%20different%20water%2 Oallocations%20on%20rice%20farm%20profitability%20in%20the%20MIA.pdf http://ec.europa.eu/agriculture/rica/pdf/cereal_report_2011.pdf http://www.andersonsnorthem.co.uk/index.php?option=com_content&view=article&id=41:cereals-outlook-maintaining-arable-profitability&catid=24:news-general&Itemid=18

However, none of these prior art molders and economists relate farm profitability and productivity to the plant physiological efficiency and its use of energy from the sun, labor, and other consumable fuels. Accounting for ZCOE, has been the key obstacle encountered by these early investigators. This obstacle has lead to incomplete understanding of farming economics. It would be nearly impossible to meet the challenges posed above without a universal tool that accurately relates all the parameters to the economic viability of growing food and biofuel energy, a tool that accounts for the role the ZCOE plays relative to the other resources. The solar energy is the primary source, but because it comes for free, it is absent from prior art accounting models.

There is, therefore, a need for a universal mathematical methodology that possesses the predictive ability to assess profitability in terms of farm resource utilization efficiencies, including the physiological energy utilization efficiency $\eta_E$. This would be valuable tool for planning, policy making, pricing, selection of product mix, etc. Most importantly, it will enable inventors and innovators to focus on the real bottle necks to be able to conceive optimum engineering solutions.

Applicant discovered such a mathematical law called: Agriculture Profitability Assurance Law, AgriPAL. Applicant has recognized the general importance and utility of this law as an inventive tool to agronomy. The inventive embodiments of the present application are based this AgriPAL tool.

More specifically, in order to accurately evaluate the economic viability and profitability of various farming and energy enterprises, the energy centric analysis and derivation of the novel, AgriPAL is embodied in the following formula:

$$\eta_E \left( \frac{\varepsilon_{sol}}{\varepsilon_{other}} \right) \frac{\overline{ROE}}{\overline{COE}} \geq (1 + p + f + v), \quad (2)$$

The most prominent feature of this law is it's the success, for the first time, in accounting for the solar energy $\varepsilon_{sol}$, which is available, at zero cost to all farmers, and other phototrophic organism growers. It is incorporated into AgriPAL through the gain other $$\varepsilon_{other} = \sum_{i=1}^{k} \varepsilon_i$$

(non solar) energy sources $\varepsilon_i$, directly related to the production of biomass energy as the product. These sources include: fuel energy for machinery, biomass feed stock energy content, manual labor energy, thermal, energy, mechanical, and chemical. The cost of each of these inputs, is converted to an energy cost equivalent, through an appropriate energy cost conversion factor in units of COE. Eq. (2) is simplified to:

$$\eta_E \left( \frac{\varepsilon_{sol}}{\varepsilon_{other}} \right) \frac{\overline{ROE}}{\overline{COE}} \geq (1 + p),$$

if (f+v) is also incorporated in $$\varepsilon_{other} = \sum_{i=1}^{k} \varepsilon_i.$$

$\overline{COE}$, is the average cost of all input energy, sources directly used to produce the products, in units of, $/kWh, $\overline{ROE}$, is the average return on energy, revenues from energy contents of all the products produced at the prevailing market prices, in units of, $/kWh, p, is the profit divided by the total energy cost, f, is the total cost attributable to the fixed capital equipment expense, CAPEX, and other fixed costs, divided by the total energy cost, and v, is the total variable operating costs, OPEX, divided by the total energy cost.

The economic viability index, EVI, is defied as:

$$EVI \equiv \eta_E \left( \frac{\varepsilon_{soler}}{\varepsilon_{other}} \right) = \eta_E g_{soler}$$

is the key parameter that measures whether or not the system or an enterprise can be profitable by testing if EVI•RCR meet the condition given by AgriPAL equation, where RCR is the ratio of the return on energy (the revenue for each kWh sold) to the cost of energy; thus:

$$RCR \equiv \frac{\overline{ROE}}{\overline{COE}}.$$

For indoor farming, in the absence of solar energy, according, to several embodiments of the present invention, control means and methods are described to enable $EVI^e = \eta_E g_e$ to be increased in order to approach unity, thereby allowing $EVI^e$•RCR to satisfy the AgriPAL condition.

Note that AgriPAL described in Eq. (2) is energy centric in that all the terms are dimensionless ratios of energy quantities or ratios of cost of energy. Since food (energy for life) and energy in general are used synonymously in this treatment, AgriPAL is a valuable tool, that in this form, or in its more general from (not presented here), is used as an inventive algorithm for the determination of the economic viability and profitability if all food or energy producing enterprise.

AgriPAL states that unless that condition is met, the enterprise is not viable. For food and energy enterprises, it made the energy parameters transparent, and at a quick glance, a conclusion can be made. For example, even though, from Table 1, $\eta_E \sim 0.005$, the solar gain $g_{sol} > 200$, is more than enough to offset the low efficiency, thereby satisfying the profitability condition. In the case of highly mechanized large farms, the fossil fuel energy (diesel) quantity, intermittently used, to run the machines for only few days, is negligible relative to the quantity of solar energy absorbed and stored by the plant over 100 day cycle. In this case the profitability is assured. In the case of sugarcane, field data suggests that $g_{sol}$ between 2000 and 4000 are achievable.

For a very small family farm, $g_{sol} > 200$ also assures profitability, because the farmer relies of human and animal muscle energy intermittently, the quantity of which is negligible relative the quantity of solar energy absorbed and stored by the plant over 100 to 1000 day cycles.

Recently, many biofuel start ups filed for bankruptcy shattering the dreams of all stake holders, entrepreneurs, employees, society, and investors. Using AgriPAL as a tool, it has been shown that these enterprises failed to meet the profitability condition, because they relied on biomass and sugars as input feedstock but did not accurately account for it. This caused a big distortion of the facts, thinking that profitability was possible, when in fact, fundamentally it is not. In other words, they did not consider this feedstock as energy that should have been a component in $$\varepsilon_{other} = \sum_{i=1}^{k} \varepsilon_i$$

in our AgriPAL tool. In fact, this bio-mass energy component is larger than the other components. If these enterprises had AgriPAL tool available, they would have not started these enterprises in the first place.

There are tens of biofuel companies which are operating on the assumption that they can be profitable. In fact they are violating the AgriPAL condition. They are mislead by the argument that one day fossil fuel will be so scarce that they can price their product higher to match that of fossil fuel, thereby assuring them profitability. According to out AgriPAL, RCR will remain nearly unchanged, i.e., the price tracts their cost of energy which is pegged to fossil fuel. More on RCR tracking is discussed below.

Practical Applications of AgriPAL

AgriPAL states that unless that condition, in Eq. (2) is met, the enterprise is not viable. For food and energy enterprises, it made the energy parameters transparent, and at quick glance, enables one to reach interesting and valuable insight. It is a tool to help lower the risk of decision making: to launch a new enterprise, to expand, relocate, to improve product mix, to leverage product mix, compete better, to reduce cost by many means.

The following examples have relevance to the present invention, as they highlight the limitations of prior art and place the inventive features in their proper perspective.

EXAMPLE 1

Profitability Conventional Farming Commodity Staple Foods

For farming commodities (staple foods) including: cereals, soybean, sugar from sugarcane and sugar beet, tubers, potatoes, yams, and cassava, the right hand side of Eq. (2) can be shown to be at least 1.3 (marginally profitable enterprises). The global market determines the commodity prices, which range between $0.25/kg and $0.5/kg. These crops have an average intrinsic energy content ~$3kWh/kg. The cost of diesel is ~$0.08$/kWh, while the cost of solar energy is zero.

From this, we determine $$\frac{\overline{ROE}}{\overline{COE}}$$

to be between 1 and 2. This ratio is nearly constant because it deals with energy and food which are globally determined and track each other in equilibrium, as discussed in this reference entitled: "Food/Fuel Price Dynamics . . . ", http://www.oliverwyman.com/pdf_files/Food-fuel_price_dynamics.pdf. The ratio, $$\frac{\overline{ROE}}{\overline{COE}}$$

changes dramatically only in temporally and spatially localized temporary situations, such as war in the Middle East or severe draughts in food producing regions. Since from the above discussions we know that $\eta_E$~0.005, satisfying the AgriPAL condition requires that, $g_{sol}$, to be between 130 and 260.

Thanks to the zero cost solar energy, farming all kinds of food is always profitable, even the most affordable, lowest priced staple foods. The gains, $g_{sol}$>100 can be maintained in the most advanced farming regions utilizing the most sophisticated efficient modem farm equipment with minimum labor energy. On, the other hand, farming in underdeveloped regions, depends on muscle energy of humans and animals to maintain $g_{sol}$>100 and be profitable even in small farm lands. This $g_{sol}$>100, is one of the key contributions discovered by Applicant that predicts, through AgriPAL, the profitability of outdoor solar farming, that sustained human population growth to the present level.

It is the same AgriPAL that is used, according to the present invention, to predict the profitability of indoor farming without the benefit of the sun, ($g_{sol}$=1, in this case), requires another gain factor, $g_e$, to substitute for the absence of $g_{sol}$. The new gain factor, $g_e$ must be high enough to satisfy the AgriPAL condition. This aspect of the present invention is shown in Section III to be possible.

$g_{sol}$ is replaced with that is generated according to many preferred embodiments on the present and co-pending applications.

EXAMPLE 2

Profitability of Green House Farming with Solar Energy

From Example 1, if we were to grow the same commodity staple foods indoors, green house, and assuming we have the advantage of two crops per year, Eq. (2), is transformed thus:

$$2\eta_E \left(\frac{\varepsilon_{sol}}{\varepsilon_{other}}\right)\frac{\overline{ROE}}{\overline{COE}} \geq (1 + p + f' + v) \tag{2a}$$

Even though we increased by a factor of 2 the productivity, $\eta_E$ and $$\frac{\overline{ROE}}{\overline{COE}}$$

remain unchanged, but the gain, $g_{sol}$, is much reduced from ~100, to low levels approaching 10, or even less than 5, and may approach 1. This reduction in $g_{sol}$, is a result of the significant increase in, $$\varepsilon_{other} = \sum_{i=1}^{k} \varepsilon_i$$

that includes new terms for heating and cooling energy, electric energy, and fuel energy and direct labor. Furthermore, the right hand side of Eq. (2a) shows an increase in the green house capital cost as reflected in the increased value of f'. The reduction of $g_{sol}$, and the increase of f', while the $\eta_E$ remains unchanged, prevents the AgriPAL condition from being met for commodity products (food and biofuel).

We, therefore, conclude from this example that indoor (green house) farming for commodity staple crops is not economically viable. It will be shown that one of the key aspects of the present invention is reversing conclusion in connection with indoor farming of commodity staple products. It is accomplished by replacing or augmenting $g_{sol}$ with another gain factor, $g_e$, that is generated according to many preferred embodiments of the present and co-pending applications. In the process, the present invention will show hopeful paths toward feeding the world, one of major challenges posed in Section I.

EXAMPLE 3

Profitability of Green House Farming for Other Foods

Other foods defined here as farm products which are not staple commodity foods described Example 1. Especially foods or crops for which the seed to harvest cycle time can be short, in the range of 30 to 60 days to enable more than n plantings each year. These crops include leafy vegetables, herbs, and others, which are not produced for their seeds, and therefore, are harvested before flowering. For these products, Eq. (2) is transformed to:

$$n\eta_E \left(\frac{\varepsilon_{sol}}{\varepsilon_{other}}\right) \frac{\overline{ROE}}{\overline{COE}} \geq (1 + p + f' + v) \quad (2b)$$

In this case the problem associated with the term $g_{sol}$ approaching 1, is compensated for by n=3 to 10 and by the relative pricing flexibility (not available for commodities) leading to a much higher $$\frac{\overline{ROE}}{\overline{COE}} = 50 \text{ to } 100.$$

This high value also benefits from the relatively low energy content ~0.3 kWh/kg of these products, and a relatively higher flexibility in setting the prices $2/kg to $5/kg. In the commodity case, $$\frac{\overline{ROE}}{\overline{COE}}$$

does not depart from between 1 and 2, as these are globally set and the producers (farmers) do not have much control over that.

The conclusion of this Example 3 is that green house farming of non-commodity food products profitability, is not only assured according to AgriPAL, but can be very lucrative.

EXAMPLE 4

Profitability of Indoor Farming with Artificial Light

The advent of high efficiency lighting systems, especially light emitting diodes, LED, has encouraged indoor farming without the reliance on the sun. There are many teachings in the patent literature of systems and methods to grow crops with artificially lighting.

For this case, our AgriPAL Eq. (2) is transformed thus:

$$n\eta_E \frac{\overline{ROE}}{\overline{COE}} \geq (1 + p + f'' + v), \quad (2c)$$

The gain $g_{sol}$ becomes 1, because we eliminated the solar energy, $\varepsilon_{sol} \to 0$. However, the fixed CAPEX cost component, f", is much higher due to the LED cost which replaces the zero cost sun. In this CEA, n reflects the number of crops per year, increasing the yield.

Assuming an optimum engineering effort that designs such a system to minimize (1+p+f"+v) to ~2 (marginally profitable), $\eta_E$~0.005 remains unchanged, and n~3, we require, that $$\frac{\overline{ROE}}{\overline{COE}} > 133.$$

This illustrates that for artificial lighting indoor farming profitability is assured if the product price is high. There are may such products that satisfy this condition, leafy vegetables, herb, fruits, flowers, and plants used for medicinal purposes such as vaccines where $$\frac{\overline{ROE}}{\overline{COE}}$$

exceeds 1000 and may exceed 10,000.

This another exemplary illustration of AgriPAL value according to Eq. (2c), to assist the evaluation of decisions launch indoor farming with artificial lighting, product selection, and pricing such products to ensure profitability.

EXAMPLE 5

The Profitability According to the Present Invention

Examples 2, 3, and 4, highlighted the challenges associated with growing staple commodity foods indoors, and why Example 1, outdoor field farming is the only presently available viable option for growing staple food to feed the world. This viable option is for the continuous reliance on the zero cost solar energy, and its associated drawbacks of large land and water requirement and their inefficient utilization. In addition, the outdoor farming constraint, subjects the growers to environmental risks of unexpected crop losses due to various factors, including: microscopic pathogens, weeds, droughts, floods, and extreme unseasonable temperature variations.

Therefore, one of the main objects of this invention is presenting an alternative to outdoor solar based 2D farming. The inventive farming systems and methods are based on the five premises presented in Section I that enable the replacement of the sun and its gain $g_{sol}$ with artificial lighting and an enhancement gain $g_e$. This will ensure profitability not only for staple food according to AgriPAL, but also enables the productions of all other crops with much higher profit margins than previously possible by prior art methods.

The combination of the five premises, presented in Section I, the discovery of AgriPAL, the gain factors $g_{sol}$ and $g_e$ generated by our new model, the PGM, described by Eq. (5) increases $\eta_E^e$ to astonishingly and surprisingly high levels heretofore thought unattainable. We will describe several inventive embodiments which result in enhancement factors, $g_e$ ranging from 5 to 10, and in other embodiments, from 10 to 50. Yet in other embodiments, $g_e$ ranging from 50 to 500 is possible. These gains will offset the low prior art efficiencies which may be in the range of 0.001-0.01, in Table 1, that are constrained by the outdoor constraints of soil and sun dependencies.

Because of the enormous plant diversity, conversion efficiency values vary from species to another, and even within varieties of the same specie. These variations are a result of environmental conditions, stresses and intrinsic traits of a cultivar bred for a specific geography and soil conditions. The examples presented herein, are used for illustration of the concepts and are not intended to be liming.

III—The New Plant Growth Model, PGM

In Sections I and II we elaborated on the significance of AgriPAL and specifically in elucidating the why conventional farming has been viable and profitable that it has sustained population growth to the present level. AgriPAL discovery lead Applicant of the present invention, an inventive method to determine agro-economic viability, of food growing and energy producing enterprises. The method is a tool, heretofore, unavailable to aid these enterprises in making rational decisions based on source science and agronomy practices, reducing their risks to launch, expand, improve or disband said enterprise.

AgriPAL takes the following three forms:

A. The solar-soil-based outdoor farming:

$$EVI \cdot RCR \geq (1+p+f+v) \tag{2}$$

B. The artificial lighting indoor farming:

$$EVI^e \cdot RCR \geq (1+p+f+v)^e \tag{2a}$$

and

C. The hybrid solar enhanced indoor farming:

$$EVI^h \cdot RCR \geq (1+p+f+v)^h \tag{2b}$$

with:

$$EVI \equiv \eta_E \left(\frac{\varepsilon_{sol}}{\varepsilon_{other}}\right) = g_{sol}\eta_E,$$

$$EVI^e \equiv \eta_E^e \equiv g_e\eta_E,$$

$$EVI^h \equiv \eta_E^h \equiv g_e g_{sol}\eta_E,$$

and $$RCR \equiv \frac{\overline{ROE}}{\overline{COE}}$$

AgriPAL may also take an alternative form by incorporating in $\varepsilon_{other}$, the energy equivalents of f+v.

III.1 Global Stable Equilibrium for RCR

According to Idso, op. cit., nearly 75% of all foods grown to sustain life are commodity staple crops: {Sugarcane and sugar beet} account for ~25%; cereals: {maize, rice, wheat, barely, oat, rye, millet, sorghum} account for ~34.5%; while tubers: {potatoes, cassava, sweet potatoes, and yam} account for 10.5%; and Oil seed crops account for ~5%.

Growers of these commodity staple crops that feed the world have no control over pricing of their products. The global commodity market sets these prices. A prolonged draught in Australia or in China will increase the price to the rest of the world and adversely disproportionately affects the poorest in Africa and Asia.

The same conclusion is reached in the case of the other commodity, the energy, the price of which is established by the global commodity market.

Therefore, for commodities, the average RCR, the ratio of the return on energy ($/kWr) to the cost of energy ($/kWh) remains nearly constant and hovers close to the values between 1 and 2, depends on the nature of the crop and its geographical sources.

The RCR ratio remaining within that range signifies that food and energy are tightly coupled commodities. This reference http://www.oliverwyman.com/pdf_files/Food-fuel_price_dynamics.pdf presents data tracing the commodity prices of food and fuels. For instance, the cost increase of diesel or other fuel used for machinery will reduce farm profitability, according to AgriPAL, Eq. (2), from the reduction both $$\left(\frac{\varepsilon_{sol}}{\varepsilon_{other}}\right)$$

and (1/COE). Therefore, the product price will increase to turn a profit, keeping RCR within that range, which seems to be a natural stable global equilibrium value.

Another insight into the global equilibrium of the RCR is gained from Brazil, which is the largest sugarcane producer with 38% and the second largest producer of sugarcane ethanol. Because of its market share leadership one would expect that it can control pricing and RCR. This is not the case. If demand for sugar increases, or supply decreases because draught in France affecting sugar beet supply, prices will increase, tempting the Brazilians to shift to producing more sugar because it is more profitable.

This in turn reduces, the supply of ethanol causing its price to rise. The latter energy price rise will increase the price of other energy sources affecting other farms products. The end result is returning RCR to the global stable equilibrium.

Government forces, legislate, or dictate, or intact polices and laws have traditionally upset this equilibrium. These events include embargoes, trade wars, tariffs, mandates to use bio-fuel, or to reduce CO2 emission. Even, in this case, RCR will stabilize perhaps at a higher or lower level artificially set to an equilibrium value within an average range.

This RCR equilibrium discussion is relevant to the present invention because it amplifies the significant of the AgriPAL, Eq. (2, a, b), and the surprising results that emanate from it. More specifically, having established that food growers, bio-fuel producers, and other and energy producing enterprises, have no control over RCR, in order to accomplish the mission of achieving both food and energy security, with no conflicts or resource competition, the only parameters available to us are:

$$\text{Outdoor } EVI \equiv \eta_E \left(\frac{\varepsilon_{sol}}{\varepsilon_{other}}\right) = g_{sol}\eta_E,$$

$$\text{Indoor } EVI^e \equiv \eta_E^e \equiv g_e\eta_E,$$

$$\text{Indoor with Sun } EVI^h \equiv \eta_E^h \equiv g_e g_{sol}\eta_E$$

The three EVI expressions comprise the energy conversion efficiency $\eta_E$. We have learned to accept that the cost of the high plant nutritional diversity to sustain human life is the low biosynthetic conversion efficiency as shown in Table 1. Out discovery of AgriPAL Eq. (2) uncovered $g_{sol} > 100$, that compensates for that low efficiency such, that $g_{sol}\eta_E$, together is high enough to satisfy the AgriPAL thereby successfully sustaining human life for thousands of years.

Nearly 75% of staple food production is a consequence of this successful union perfect $g_{sol}\eta_E$>1, leading to affordable energy, proteins, vitamins, and other nutrients for the well being of all humans. The improvements attributed to $g_{sol}$, stem from the inventive farming mechanization solutions as well as creative agronomic practices that enabled the production of enormous quantities at lower labor cost, and lower waste.

The improvements attributed to $\eta_E$, emanate from advances in biology, photosynthesis process, chemical sciences and technologies and bioengineering enabling the understanding and optimization of nutrient requirements, low cost fertilizer manufacturing, pesticides, and transformation of genomes, and breeding methods. These together lead top increases of annual yields per hectare about 20 fold.

This accelerated steady growth of crop yields spawned the Green Revolution of the 50's and 60's is attributed to this success. It staved starvation in many countries, provided profitability assurance, and made many countries food self sufficient, including: the USA, Mexico and India.

Unfortunately, increases in $g_{sol}\eta_E$ have slowed to a halt, triggering the alarming dire predictions related to our ability to feed the world in 2050. Optimistically, breeders, plant scientists and agronomists, are using modem tools to reverse the trends and to increase $g_{sol}\eta_E$. Tools used include: Faster, cheaper genome sequencing, bio-engineered organisms that exhibit novel desirable traits encoded in their transformed genomes, plant cell culture, and accelerated breeding though double haploid technology to produce stable pure breeds.

Now that the improvements through $g_{sol}\eta_E$ union are no longer realizable, succumbing to its mandatory requirement of farming outdoors to enjoy the zero cost of solar energy is revealing its detrimental consequences.

There is, therefore, a need for a new economic viability index, an alternative to conventional EVI=$g_{sol}\eta_E$, that will enable indoor farming (sans soil, sans sun) with artificial lighting, thereby eliminating the detrimental consequences of soil-sun-based outdoor farming. This new enhanced index is our EVI$^e$≡$\eta_E^e$≡$g_e\eta_E$ resulting from PGM and realized by inventive means and methods according to the present invention. It meets the condition to produce not only affordable staple commodity foods but also relatively higher price food, and other high value added products.

The high value added products include: plant made materials, proteins, nutraceuticals, and pharmaceuticals, vaccines. For example, recently shortages of guar gum (from guar bean) for industrial use such as oil and gas hydrofracking production methods caused the prices to jump 10 fold. The material is a polysaccharide possessing a highly prized unique rheological property. In addition to being food, the material is also used in personal care products.

III.2 The High Cost Zero Solar Energy, ZCOE

In the above, we discussed the high cost (detrimental consequences) of the mandatory dependence on solar energy; enticed by the zero cost to ensure economic viability outdoor farming. One of the consequences is forcing conventional agronomy to succumb to accepting ~0.5% and as low as 0.1% efficiency. This afforded little or no control over $\eta_E$ to make further improvements beyond what has already been achieved in the last 50 years, astonishing ~20 times yield improvements.

Going forward, perhaps only fractional gains may be realized which are offset by higher per capita demand. The low efficiency and lack of control of outdoor solar-based and soil-based farming have lead to the requirement of enormous resources that are used inefficiently including: insatiable demand for two dimensional arable land, water, fertilizers, and pesticides.

Examples 2, 3, and 4, presented in Section II, highlighted the challenges associated with growing staple commodity foods indoors relying on the limited prior art understanding of $\eta_E$, ($\epsilon_c$, Eq. (1) Section I), and why Example 1, outdoor field farming is the only presently available viable option for growing staple food to feed the world.

This viable option is for the continuous reliance on the zero cost solar energy, and its associated drawbacks or requiring fast resources that are not utilized efficiently. In addition, the outdoor farming constraint, subjects the growers other consequences; environmental and economic risks, unexpected crop losses due to microscopic pathogens, weeds, droughts, floods, and extreme unseasonable temperature variations.

These collectively embody the liabilities of soil based farming. As discussed above, in connection with ultra-trace nutrients, and arsenic in particular, the health concerns associated with uncontrollable soil parameters highlight the soil liability and is the impetus behind abandoning outdoor soil-based farming and the adoption of SanSSoil methods of the present invention.

III.3 Acquiring New Agronomic Controls over an Enhanced $\eta_E^e$

The discovery by Applicant's of the AgriPAL has been a valuable catalyst. It enabled the following:

A. Providing, for the first time, an analytical expression relating plant (organism) physiological efficiency and its direct impact on the economic viability for producing products from the plant.

B. Linking all the physiological, manufacturing, and marketing parameters to the economic sustainability in an exact unambiguous quantitative manner C. Enabling mathematical and quantitative accurate description to account for the role the solar energy plays, at zero cost, in plant production and in its direct coupling to the physiological efficiency, thereby elucidating, for the first time, why solar-based outdoor farming has been economically profitable.

D. The economic success of outdoor solar-based farming, as elucidated by AgriPAL, has been the main catalyst enabling realization of profitability of indoor farming artificial lighting, according to the present invention.

E. Finally, the realization that indoor farming can be profitable according to AgriPAL Eq. (2a), new agronomic control tool of through $\eta_E^e$=$g_e\eta_E$, have become possible.

F. The new PGM made the physiological conversion efficiency transparent by revealing large number of parameters which can be controlled, and a plurality of means to achieve $g_e$ by various combinations of controlling those physiological parameters from a large group.

G. In outdoor solar-based farming, AgriPAL is fulfilled by means of EVI=$g_{sol}\eta_E$, which afford limited control, whereas in the case of indoor farming, it is fulfilled by $\eta_E^e$=$g_e\eta_E$, wherein $g_e$ affords us new levels of controls, in contrast with $g_{sol}$ that has limited controls.

III.4 Making Plant Efficiency $\eta_E^e$=$g_e\eta_E$ More Transparent

I now describe an improved alternative plant growth model, PGM, which has enabled Applicant to be free from the shackles of conventional agronomic practices, by avoiding the reliance on the four pillars of conventional faming: sun, soil, 2D arable land, and ample rain fall geography. This departure leads to a path of plant productivity (yield) increases of more than 10 fold.

As is well known, phototrophs are the organisms that carry out photon capture to acquire energy, http://en.wikipedia.org/wiki/Phototroph. Many use photosynthesis to convert carbon dioxide to organic compounds, including: carbohydrates, sugars, monosaccharide (glucose), disaccharides (sucrose), oligosaccharides, and polysaccharides (starches, cellulose), lipids, and proteins. The total biomass, BM, (living, or dead) produced by the photosynthetic conversion comprises various organic compounds, that together have an intrinsic average energy density, (energy content), $\epsilon_d$ in units of MJ/kg or kWh/kg. For example wheat biomass ranges from 3-4 kWh/kg, while lettuce and spinach biomass the range is from 0.2-0.4 kWh/kg.

The energy conversion efficiency, $\eta_E$, is the ratio of the output biomass energy content, to the total input energy during the seed-to-harvest time (growing cycle time), $\tau_{sth}$, is described given by:

$$\eta_E = (\epsilon_d Y)/\overline{P_{sat}} \tag{3}$$

where, Y, is the output biomass yield in units of (kg/m²/year), $P_{sat}$ is the average photon power, in W/m², at photosynthetic saturation intensity from the sun, lamps, light emitting diodes, LED, or a combination thereof.

Living organisms include: plants, animals, and fungi ranging in size from the unicellular micro-organisms including: algae, yeast, bacteria and cyano-bacteria, to mammoth sizes such as the 100 m high Sequoia tree and the 200 ton blue whale. I have discovered that the growth dynamics of all of these living organisms are solutions to rate equations derived from energy and mass conservation laws.

They have similar growth patterns but their growth rates and substrate (resources) utilization efficiencies differ depending on the specie. The difference is stored in their genomes that evolved over a time span ranging from millions to billions of years. All organisms evolved from common ancestors with whom they share evolutionarily conserved genes that through natural selection are optimized and retrained express the production of enzymes that perform identical functions at the cellular level.

My analyses and derivations (not shown here) led me to describe the growth of organism and specifically plants according to the following BM growth function:

$$G_{BM}(t) = G_{BM}(\infty)(1-e^{-Kt}) \tag{4}$$

where, $(1-e^{-Kt})$, is a composite growth function that saturates to an average maximum mass, $G_{MB}(\infty)$, at a rate K, both quantities (phenotypes) are determined by the genome of a specie's many cultivars or varieties. The growth function is the measurable quantity that has agronomic relevance. It is referred to as composite because incorporates, and averages or aggregates, a plurality of growth rates taking place at the cellular level, even though they are not explicitly revealed in this function.

Said plurality of growth rates represents the cascades of numerous enzymatic biosynthetic reactions occurring in millisecond time scale or sub millisecond. The combination of these cascaded (parallel and sequential) activities aggregates and yields the composite growth function, that is observable in seconds, minutes, hours and year time scales. The composite function does not start at t=0, instead, it begins after the seed (embryo) has adapted to the environment, germinated and emerged as a seedling.

The composite growth functions of Eq. (4) may slow down and resume acceleration in periodic growth spurts, repeating nearly the same exponential behavior of Eq. (4). The derivative $dG_{BM}(t)/dt$ of the composite function exhibits periodic peaks and valleys. Such behavior is normal in perennial trees which stop growing in the fall and resume in the spring. Such spurts are also result from ratooning or pruning of certain trees such as sugar cane, moringa tree, and the like, and pinching off selectively shoots in order to spur the growth of branches.

The organisms described by the composite growth functions are relevant and included in many aspects of the present invention. They include natural or synthetic organisms whose genotype and phenotypes are altered by recombinant bioengineering practices, well known in the art, in order to perform specific tailored functions and or deliver substances of commercial interests. These recombinant organisms of various sizes include: unicellular, multi-cellular, micro-organism and macro-organisms.

The BM yield at seed-to-harvest time, $\tau_{sth}$, is given by:

$$Y \equiv [G_{MB}(\infty)/\tau_{sth}](1-e^{-K\tau_{sth}}) \tag{4a}$$

This is the rate of total mass, in kg, grown and harvested for each area cultivated per cycle time. In this case the cycle time is the same as $\tau_{sth}$. At $K\tau_{sth}=1$, $Y(1)=0.632[G_{MB}(\infty)/\tau_{sth}]$. In this case the crop is harvested at the maximum growth rate, in the vegetative phase, approximately before flowering. At $K\tau_{sth}=3$, $Y(3)=0.95[G_{MB}(\infty)/\tau_{sth}]$. In this case the crop is harvested after fertilization and maturity of the new seed.

Depending on the species and cultivar, $\tau_{sth}$, may range from hours, as in mass doubling time of algae, 6 weeks for *Arabidopsis thaliana*, or in the range or 10-20 weeks in many flowering plants of agronomic value. The short doubling time of algae and other phototrophic organisms such as wolffia, and, lemna (duckweed), have biofuel agronomic values.

When $\tau_{sth}$ is very long ~100-150 days, as in the case of cereal production, the seasonal large temperature variations do not permit more than once a year cultivation cycle, Eq. (5a) becomes: $Y \sim [G_{MB}(\infty)/year]$. This outdoor cultivation causes a loss of macroscopic temporal efficiency of a factor 3.

From Eq. (3) and Eq. (4a), the energy efficiency can expressed as:

$$\eta_E = \epsilon_d Y/\overline{P_{sat}} = [\epsilon_d G_{MB}(\infty)(1-e^{-K\tau_{sth}})]/\overline{P_{sat}}\tau_{sth} \tag{4b}$$

and, introducing the new PGM form:

$$\eta_E = \xi\phi = \xi\prod_{i=1}^{n} S_i \tag{5}$$

$$\phi = \prod_{i=1}^{n} S_i = S_m S_I S_{II} S_{env} S_{br} S_{photon} \tag{5a}$$

$$\xi = \xi_{sp}\xi_t\xi_f \tag{5b}$$

This naturally describes the efficiency, according to our new PGM, as the product of two separate agronomic quantities: macroscopic $\xi$, and microscopic $$\phi = \prod_{i=1}^{n} S_i.$$

The latter embodies all the physiological aspects of the organism growth at the cellular level, at millisecond, ms, time scale of even sub-ms time scale and spatial scale in the ~0.1 mm-1 mm range. This reveals more transparently the components of the composite growth function by relating the asymptotic mass, $G_{MB}(\infty)$, to the plurality of substrates or resources, $S_i$, involved in the plurality of growth reactions taking place at the cellular level representing a plurality of enzymatic biosynthetic reactions involved in growing and building the organism to a maximum value limited by $G_{MB}(\infty)$.

It can be shown that the absence of any one of the substrates in $$\phi = \prod_{i=1}^{n} S_i$$

will cause $G_{MB}(\infty)$ to vanish. This level of detail, revealed formally for the first time, will directly provide the capacity to engineer organisms, and growth systems for profitability assurance according to AgriPAL, Eq. (2).

The microscopic physiological efficiency $$\phi = \prod_{i=1}^{n} S_i,$$

is the product of a plurality of components, $S_i \in S$, each of which describes, sequential and parallel events involved in the growth of the organism, including: photon capture, electron excitations, charge transport, electrochemical reactions, enzymatic bio-synthetic reactions involving enzymes, and cofactors, PSI, PSII, Rubisco, and other enzymes, and such intermediates as ATP, ADP, NADP+, and NADPH.

The macroscopic efficiency, $\xi$, deals with the macroscopic growth aspects of one or more whole organisms and involves temporal scale in the range of seconds to days and spatial scale in the range of centimeters to hectares.

Each member, $S_i \equiv \sigma_i(\infty)/\sigma_{imax}(\infty)$, $(S_i \in S)$, is related to the ratio of an asymptotic substrate quantity present $\sigma_i(\infty)$ to an optimum quantity, $\sigma_{imax}(\infty)$ that maximizes the efficiency, such that $S_i=1$, when $\sigma_i(\infty)=\sigma_{imax}(\infty)$. For example, if the quantity of iron available and absorbed a the organism is less than optimum, it will lead to $S_{Fe}=\sigma_{Fe}(\infty)/\sigma_{Femax}(\infty)<1$. In fact, if $\sigma_{Fe}(\infty)$ is decreased below a threshold value, the organism will not survive, as it will be unable to carry out vital photosynthetic functions. The same outcome will result pertaining to deficiencies of the other substrates.

The ratios for all components of the set, $S_i \in S$, result from cascades of enzymatic biosynthesis reactions as solutions to a plurality of (Michaelis-Menten)-like kinetics equations $$E + S \underset{k_r}{\overset{k_f}{\rightleftarrows}} ES \overset{k_{cat}}{\longrightarrow} E + P$$

described in http://en.wikipedia.org/wiki/Michaelis%E2%80%93Menten_kinetics.

Controlled Efficiency Gain:

Let us take $CO_2$ as an example. Assuming that all other parameters in the complete set $\{S_i\}$ have optimum values (this is not possible in the case of uncontrolled outdoor farming, but may come close in the case of controlled indoor farming), then $S_{CO_2} \equiv \sigma_{CO_2}(\infty)/\sigma_{CO_2max}(\infty)$ becomes the value that limits the efficiency because the RUBISCO enzyme machinery is not utilized efficiently since the ambient (outdoor) $CO_2$ level (~400 part per million) is not optimum.

Figure 1B:
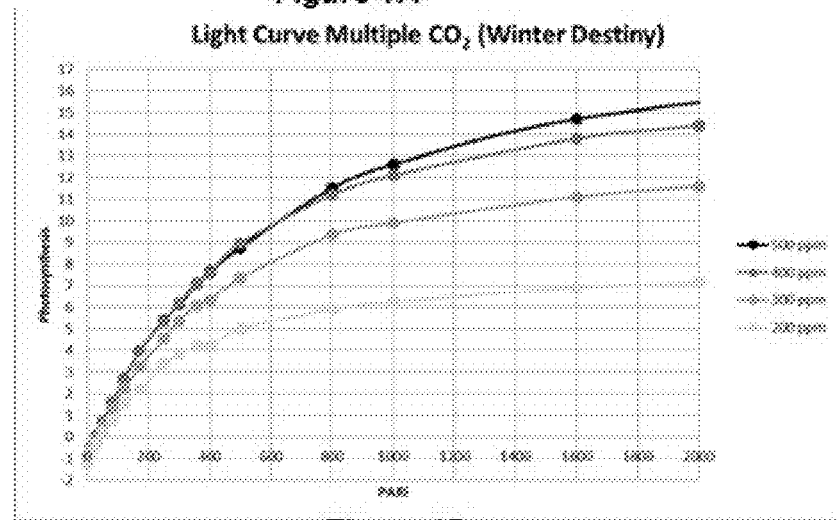
Figure 1C:
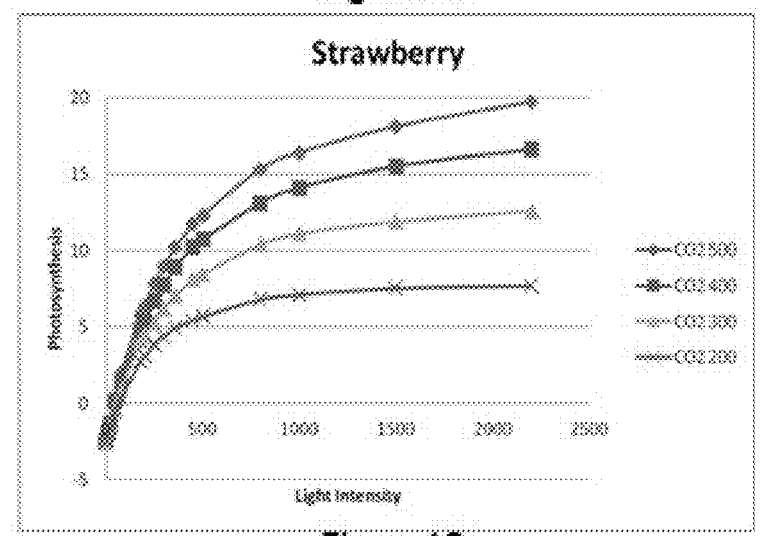

FIGS. 1A-1C present experimental measurement of photosynthesis, $CO_2$ assimilation of lettuce and strawberry cultivars as a function of light intensity, PAR, for different $CO_2$ input levels ranging from 200 ppm to 500 ppm, and 80% relative humidity. It was carried out using LI-COR System 6400xt instrument. In this experiment we increased the levels to 500 ppm higher than the average ambient level of 390 ppm. Other experiments have shown that much higher levels (>10,000 ppm) of $CO_2$ levels have been assimilated by algae species.

The experiment illustrates that at ambient $CO_2$, (conventional outdoor farming) and at light intensity lower than saturation intensity, the plant productivity is much reduced from the much higher optimum values.

Let $\alpha_{CO_2}$ be the reduction from an optimum $S_{CO_2}^{opt}$, then $S_{CO_2}=\alpha_{CO_2}S_{CO_2}^{opt}$. This reduction can be measured from FIGS. 1A-1C when the $CO_2$ and PAR are known, the deviation from optimum is considered a loss (lost opportunity for higher yield). From this we define the gain in efficiency as $g_{CO_2} \equiv 1/\alpha_{CO_2}$, and $S_{CO_2}^{opt}$ as $g_{CO_2}^{opt}S_{CO_2}$. In the case when an enhanced efficiency $S_{CO_2}^e=g_{CO_2}^eS_{CO_2}<g_{CO_2}^{opt}S_{CO_2}^{opt}$ is prevailing, there is a corresponding enhanced gain factor $g_{CO_2}^e<g_{CO_2}^{opt}$. This is an examples degree of control over the gain factors afforded by indoor culture.

Similar gain factors can be realized by the optimization of the other substrates and environmental and other relevant photosynthetic parameters. This is one of the key aspects of the present invention in connection with indoor sun-less, and soil-less farming. More specifically the realization of gain factors that enter into AgriPAL Eqs. (2, 2a. 2b) that ensure profitability for staple commodities such as food and bio-fuel.

From the above, we recognize that for each member of the set, $S_i \in S$, there exists an enhanced member in the set $S_i^e \in S^e$, having the relation $S_i^e=g_i^eS_i$ and the opportunity for maximization of $g_i^e$ to reach $g_i^{opt}$ under optimum conditions.

This general conclusion is equally applicable to any member in $S_i$: Cu, Mo, K, or any other essential element as shown below.

Note that one key aspect of the transparent inclusion in Eq. (5), (5a), (5b) of every nutrients, primary or secondary, main substrates, environmental factors, genetic factors and energy inputs, is the democratization of value (equal importance) of each of these parameters. The absence of any one, will render the whole to a much lower value (size, color, taste, aroma, nutrition, etc), or even death of the organism. For instance, no matter how small the copper trace may be, in certain plants, its absence will render the organism useless.

Equally important, an overdose above an optimum value of a certain trace element, may be toxic, or may be antagonistic to the uptake of other elements. For this reason each component in the set $S_i^e=g_i^eS_i$ has an optimum range: a minimum level and a maximum level, which lead to the highest productivity. Below the minimum value of a certain component, growth may either be prevented, or substantially reduced. Above the maximum value, may limit growth to a maximum, saturating or asymptotic value, or may be considered a toxic overdose that has adverse effect on the viability of the whole plant.

In addition to the primary, secondary and traces nutrients that need to be controlled, there are ultra-trace nutrients the levels of which vary locally from one soil geography to another. The benefits of these nutrients to the plants are not well established. However, humans may ingest plants laced with levels of arsenic that are harmful to human health. The following are exemplary references discussing ultra-trace nutrients, their roles in plant growth and their potential impact on humans and their ultra nutrients:
http://www.voiceofeden.org/wp-content/uploads/2012/06/Importance-of-Mineral-elements.pdf
http://abcnews.go.com/Health/arsenic-rice-report-finds-worrisome-levels/story?id=17267872#.UGFvzKP3O1s
http://www.who.int/ipcs/features/arsenic.pdf Recently, a major consumer magazine is warning Americans to limit how much rice they eat because of concerns over arsenic and the FDA is investigating the matter. Researchers have found geographical distinctions in arsenic levels, with white rice grown in Arkansas, Louisiana, Missouri, and Texas, containing higher levels than rice samples from other parts of the country. Those four states account for 76 percent of domestic rice produced. This alarming finding has spurred the US Congress to action:
http://www.huffingtonpost.com/2012/09/21/rice-act-arsenic-delauro-pallone-lowey_n_1904490.html The health concerns associated with uncontrollable soil parameters is yet another proof that soil is a liability and the driving force behind abandoning outdoor soil based farming and the adoption of SanSSoil methods of the present invention.

A second aspect of the transparent inclusion is related to efficiency gain control: $S_i^e = g_i^e S_i$. The absence of any key members means death, the presence of only a fraction of the optimum level means less than optimum yield, longer maturity time, stunted growth, etc. One the other hand, much higher level (over dose) of minerals above the optimum, leads to toxicity, death lower yields or consumer toxicity.

One of the key aspects of the present invention is the benefit of the gain control through $S_i^e = g_i^e S_i$, enabled by the controlled, enclosed environment of indoor farming. This privilege, in not available in the case of outdoor solar-based farming, where, the low $S_i$, continues to be in effect. Soil analysis is required in order to determine what nutritional supplements to add to the soil. Since soils differ even in adjacent regions it is not possible to purchase nutritional supplement products that remedy exactly the deficiency of all soils.

The lack of control of soil components, toxicity to plants and humans, the presence of pests, the uncontrolled exposure to temperature extremes, and other adverse environmental and climactic, together embody the soil liability.

The Microscopic Physiological Efficiency Components

Eq. (5a) separates the set S into related groups. The following is a non limiting exemplary grouping scheme. Other schemes may prove advantageous and may incorporate other components physiological and or physical parameters known to influence growth and yield. Few examples have been given to illustrate the roles of certain parameters; leaving out of the discussion other parameters should not limit the premises based on which the inventive embodiments are build.

First grouping scheme:

1. $S_m = S_{CO_2} S_{H_2O} S_{O_2}$:

The main ingredients for building organism biomass: carbon dioxide, $CO_2$, water, $H_2O$, and oxygen, $O_2$ which together account for ~99% of the organism weight. It comprises biosynthesized substances that include: hydrocarbons, sugars, starch and polysaccharides.

2. $S_l = S_N S_P S_K$:

The primary nutrients made of nitrogen, phosphors and potassium compounds. They are responsible for life giving bio-molecules, including: amino acids, DNA, RNA, ATP, ADP, NADP, polypeptides, phospholipids among others.

3. $S_{II} = S_S S_{Ca} S_{Mg} S_{Mn} \ldots S_{Cu}$:

These are the secondary nutrients, Ca, Mg, S, and the trace micronutrients, B, Cl, Cu, Fe, Mn, Mo, Zn, among others, that are required in parts per million quantities, PPM. They are essential in spite of their relatively small (trace) quantities for the construction of key enzymes responsible for the regulation of growth, reproduction, signaling, timing, and storage. The following references teaching more details related to the key roles nutrients play: http://www.brglimited.com/download/MicroNutrientInfo.pdf, and http://www.norganics.com/applications/trace.pdf The deficiency in any of the above substrates, i.e., $S_i = S_i(\infty)/S_{imax}(\infty)$, lower the overall efficiency of the whole organism. If any one of these substrates is absent, clearly, the efficiency is zero and the embryo dies. On the other hand, the existence of an overdose of these the trace elements or undesirable elements (Pb, As, Se, Cr, and others) that are not required by a particular specie, will have adverse phytotoxicity impact on the plant, and the consumers of the plant. The following references teach more details about the impact of control of nutrient quantities: http://www.plantstress.com/articles/up_waterlogging_files/waterloging-toxicity.pdf, http://www.ecn.nl/docs/society/horizontal/hor8_phytoxicity.pdf 4. $S_{Br}$:

This efficiency component pertains to the genotype and the traits (phenotype) of the organism. In conventional soil-based, solar-based outdoor farming, $S_{Br}$, is constrained by the local geography that is characterized by specific resource availability including: latitude, temperature, water, intensity of solar illumination, temporal availability of illumination (day lengths, season,), salinity, pH, and the local specific trace quantities of mineral. Certain locations are suitable for the high yield growth of specific cultivars while they cannot support others.

As is well known in the art, breeding is an expensive enterprise that is constrained to produce seeds of cultivars that can maximize their growth in the maximum geographical locations as possible, to ensure profitability of the breeding enterprise. It is costly custom breed a plurality of cultivars optimized to cover many small geographical regions. The consequence of this, is the breeding of cultivars with a compromised set of traits, in other words, the efficiency $S_{Br}$ is less than ideal.

One key aspect of the present invention is the decoupling of indoor faming from the conventional soil constraints, which we also refer to as SanSSoil farming. More specifically, the present invention enables the elimination of the constraints of breeding cultivar for different local geographies. The controlled enclosed farming according to the present invention enables the growth of all organisms in any geographical location with the highest yield possible provided one adheres to a uniform set of rules and growth parameters. This is never possible in outdoor farming.

The decoupling from the soil, leads to an optimized cultivars with and enhanced $S_{Br}^e = g_{Br}^e S_{Br}$, with $g_{Br}^e > 1$ controlled by an intelligent system controller that dispenses the correct amount of nutrients, the correct pH and the optimum environmental conditions for maximum yield.

According to the Mudler's Chart, and recent discoveries, the root uptake of a one or more nutrients can be antagonistic causing the inhibition (limitation) of uptake of other nutrients as a result of altering the pH and electrochemical potentials. In other situations, the presence of one or more nutrients has a simulative effect of enhancing the uptake of others. Indoor SanSSoil farming has an unprecedented opportunity to control the nutrient uptakes to enhance the uptake, eliminate competition, overdose and as a result will increase the overall gain factor $g_e$.

One aspect of the present invention is to use a combination of foliar feeding and root feeding in parallel or sequentially to beneficially enhance the uptake of nutrients. Another aspect of the invention is to sequentially pulsing groups of nutrients, i.e., applying a first short duration burst of a first group of nutrients, followed by a second short duration burst of a second group of nutrients, and the sequence is repeated as needed.

These traits of plants (organisms) had evolved over a long time before the interference of humans. Humans have practiced breeding methods over thousands of years since the domestication of relevant food crops. They later accelerated and perfected breeding methodologies guided by Mendelian laws. This was a key contributor to yield increases of more than 10 fold and the Green revolution of the 1960's. Since 1990, recombinant DNA bioengineering technologies have produced varieties of GMO's that increase the plant productivity, and pest resistance.

There continues to be the opportunity to achieve enhanced efficiency and yield by means of modem recombinant bio-engineering and modem breeding methods to increase the efficiency though $S_{Br}^{e} = g_{Br}^{e} S_{Br}$. Permanent or transient genetic transformation of plants can regulate and optimize all aspects of their growth depending on the beneficial new genetic traits that alter enzymatic bio-reactions discussed above.

5. $S_{evn} = S_{soil} S_{pH} S_T S_{weather} S_{pest}$:

The efficiency components combine the effects of the environments on the organism health and agronomic profitability. This is one key aspect of the reliance on the zero cost of solar energy. One of its main constraints is the requirement of cultivating outdoors on large 2D areas subjected to many adverse environmental impacts. In addition to the bio-chemical aspects of the soil discussed above, the soil serves many purposes including: mechanical support of the root, nitrogen fixing, supplying water and oxygen, supplies minerals that affect the pH.

The combination $S_{soil} S_{pH}$ optimally should be close to 1 any departure from optimum will be considered a loss. This can be reversed as gain, acceding to aspects of the invention by means of controlled SanSSoil indoor culture methods. The seasonal and daily temperatures and weather conditions contribute to losses through $S_T S_{weather}$ have significant predictable and unpredictable roles that impact the farmers' activities and profitability. The unpredictable temperature and weather conditions pose significant uncontrollable risk of plant productivity reductions. Too much or too little rain, unseasonable high or low temperature at unpredictable times, all pose risks and enter the efficiency equations. Finally, $S_{pest}$, measures how effective the farmer is able to avoid or minimize the impact of plant diseases, weeds, birds, and other pests.

6. $S_{photon} = S_\lambda S_t S_{sp}$

This group deals with photon energy resource that is the driver of photosynthesis energy conversion and food production.

6.1 The spectral efficiency: $S_\lambda$

It is well known that the solar radiation spectrum is quite broad, spanning the range from the ultra-violet to the infra-red. The plants however, absorb only a narrow portion of that spectrum, in the visible range, concentrated in two prominent chlorophyll absorption peaks near 400 nm and 680 nm. The region in between, is the green region that is not absorbed, and endows all plant leaves with that color. The absorbed radiation is referred to in the plant science literature as the Photo-synthetically Active Radiation, PAR.

The spectral efficiency $S_\lambda$ is approximately 0.487, which represents the energy portion, PAR relative to the total energy of the solar radiation spectrum. Plants have evolved to maximize growth by absorbing the blue and the red components. However, in our PGM, we eliminate the need for the sun radiation, to enable us to control the optimum photon density and energy to achieve the maximum growth rate and energy utilization efficiency. This allows us to obtain $S_\lambda = 1$, achieving a factor of 2 gain, by using a narrow LED wavelength near 650 nm or any where between 650 nm and 680 nm. LED's in this range have the advantages of being very efficient and at lowest cost.

6.2 The Microscopic Spatial Efficiency: $S_{sp}$

Using modem microscopy, it has become well known (http://en.wikipedia.org/wild/Plastid) that plastids are organelles that comprise the machinery necessary for converting light energy and CO2 into hydrocarbons. Chloroplasts are the green plastids that comprise chlorophyll pigments that are responsible for absorbing light. However, while chlorophyll density in plant cells is very high, it does not occupy the entire plant cell volume. This enables us to measure accurately, the spatial occupancy efficiency, $S_{sp}$ of the light harvesting antennas.

It can be shown that the value of $S_{sp}$ approaches ~0.5. According to one aspect of the present invention, the enclosed indoor farming enables all the light to remain in the system by means of recycling (reflecting) from one organism to another. This is made possible by means of ensuring that light is absorbed within the system the components of which are made substantially non absorbing. In this case $S_{sp}$ may approach 1, thereby garnering a relative gain in efficiency of a factor of ~2.

Indoor farming, therefore, enables the realization of a gain of 4 from the maximizing both $S_{sp}$ and $S_\lambda$ 6.3. The Microscopic Temporal Efficiency: $S_t$ In formulating the new PGM, Applicant discovered the microscopic temporal factor $S_t$ in the millisecond time scale, that represents the temporal mismatch between the enzymatic kinetics of Photo System II, and Photo System I, the fast light reaction, on the one hand, and the slow enzymatic Calvin reaction (dark reaction) responsible for assimilating CO2 and producing glucose. Applicant discovered that this temporal mismatches factor is between 5 and 10 that previously had been unaccounted for as photosynthetic loss. This temporal loss factor $S_t$ is identified, without being limited by theory, as the ratio $$S_t \approx \frac{\tau_{light}}{\tau_{dark}} \approx 0.2 - 0.1.$$

This has been measured experimentally by Applicant by means on inventive pulse light photosynthesis experiments that varied the pulsed light frequency from 10 Hz to 500 Hz, and pulse duty cycles from 100% (CW) down to 0.1%. These experiments are discussed below, with the aid of FIGS. 1E-1H.

Conducting a series of experiments varying plant species, (several lettuce varieties, broccoli, geranium, strawberry) Applicant confirmed the possibility of evolutionarily conserved nature of $$\frac{\tau_{light}}{\tau_{dark}} \approx 0.2 - 0.1,$$

and succeeded conceiving inventive features according to the present invention that increase the gain of the efficiency by factors of 5-10 in these plants.

The Macroscopic Efficiency Components

The microscopic, physiological yield components Eq. (5a) described in detail above reveals efficiency components, and parameters of gain and loss that has not been previously and transparently investigated. Equation (5b) describes additional macroscopic components, affecting the overall yield, that also had not previously been explicitly identified or described by plant scientists and agronomists. Their relevance is related to the economic viability and profitability according to AgriPAL. This may be unintentional omission for outdoor soil-based, sun based farming, because the growers and agronomist have had no or limited control over the growth condition as a result of their reliance of solar energy at zero cost.

On the other hand, our PGM removed the sun and soil as constraints thereby enabling a new focus on new loss mechanisms and how they can be exploited for indoor farming according the present invention by inventive means to reverse the losses, turning them into gain components of $g_e$.

Each of the macroscopic efficiency components in the group: $\xi=\xi_{sp}\xi_t\xi_f$ is now in turn described.

1. The Macroscopic Temporal Efficiency: $\xi_t$

The microscopic temporal efficiency $S_t$, described above, is the embodiment of the enzymatic kinetic speed of responses of various reactions that take place in millisecond time scale. The macroscopic temporal efficiency, $\xi_t$, on the other hand, involves the life cycle time trajectory, (seed to harvest time $\tau_{sth}$) of the organism as a whole. For high plants, the germination, vegetative growth (exponential), flowering, pollination, fertilization, and fruit (seed) ripening, all take place in a time scale of weeks and months. The model plant Arabidopsis Thaliana needs about 6 weeks, while soybean, wheat and rice need 14 to 20 weeks.

It is well known that the cycle time is influenced by many factors including environmental (soil, pathogens, weed, temperature, water, illumination hours per day), agronomic practices, and genetic, and nutritional. Applicant recognized that conventional prior art outdoor farming methods, crucially dependant on the zero cost solar energy, are wasteful of time and do not have flexibility to improve the efficiency $\xi_t$.

Let us take the example of wheat, corn, or soybean seeds that are planted in the fall, October. 6 months will elapse before seedlings emerge. The emergence may be one month early or one month late deepening on the weather. Harvesting may be in July or August. The efficiency is therefore recognized here as the time utilization reaction: $\xi_t=\tau_{sth}$ (days)/365 days. In this example: $\xi_t=120/365$ days=0.329. Due to weather uncertainty, and the various other factors, such as the quality of the seed, $\xi_t$ may be 0.27 or may even be as low as 0.24.

Because we concluded that indoor farming for staple food is out of the question, the potential for a factor of 3 or more temporal efficiency is not realizable with prior art outdoor farming methods.

One aspect of the present invention is teaching systems and methods that substantially regain the temporal efficiency lost outdoor environments for growing staple food, by using, instead, inventive architectures for indoor environment agriculture endows with the capability to enable energy efficiency $\eta_E$ to increase by factors ranging from 5× to 50× or even higher. This will allow the number of crops harvested per year to be $1/\xi_t>3$, which is the increase of annual yield per hectare.

Yet another aspect of the present invention is allowing the possibility of increasing the temporal efficiency by means compressing $\tau_{sth}$ by another factor of $n_t$. This is a temporal compression of the plant seed to harvest cycle time by $n_t$, so that the annual yield increases by $1/\xi_t=365(n_t/\tau_{sth})$. This temporal efficiency enhancement according to some aspects of the invention is in the range of 3-10, and more preferably from 3-20, and even more preferably from 20 to 50. Yet in other embodiments, the enhancement will exceed 50.

This macroscopic temporal enhancement in addition to other efficiency increases garnered from the components of, $\Phi_{micro}$, according to embodiments in the present invention have a multiplicative factor to give a large overall energy efficiency enhancement, $\eta_E^e=g_e\eta_E$ in excess of 50 time or even in excess of 100. It is these composite enhancements that enable the indoor farming of staple foods and other foods profitably. The ability to profitably cultivate and harvest many foods according to the profitability assurance, AgriPAL described in Eq. (2) can be shown not possible using prior art indoor farming.

2—The Macroscopic Spatial Efficiency: $\xi_{sp}$

Another agronomic loss factor that is recognized by plant scientists and agronomist is the spatial losses, or low space utilization efficiency $\xi_{sp}$. While it is recognized, virtually no efforts have been taught by prior art related to how to increase $\xi_{sp}$. The main reason is the reliance on the zero cost of solar energy, thereby succumbing to the inability to deal with and control the low resource utilization efficiencies, comprehensively described by Eq. (5), (5a) and (5b).

Once again we look at exemplary situation of cultivating soybean, wheat, or corn in such regions as Nebraska, Kansas or Iowa. Seeds are planted in October and the seedling will emerge in March or April depending on the weather. During that period, the land as an asset is not utilized for anything else. The is factored in the low utilization efficiency $\xi_{sp}$. After the seedlings emerge and begin their vegetative growth phase and before the full canopy forms, the space between the plants is not filled which is manifest itself, once again in low $\xi_{sp}$.

Above the soil and beyond the plant height, 1-3 meters, the three dimensional space is not utilized for any purpose. Again, this loss is reflected in $\xi_{sp}$. At the time, the space is not utilized efficiently, solar energy is squandered and is accounted for by means of the temporal efficiency, $\xi_t$, discussed above.

Another aspect of the present invention, therefore, is the teaching of an inventive three dimensional agriculture, multi-layer or multi-level farming, that increases spatial utilization efficiency by at least a factor of 10. By further increasing the number of vertical layers to about 100, the volumetric yield is increased by this number.

In one preferred embodiment, we describe an inventive integrally made plant growing module, or an integrally made plant growing element, or growing structure, a plurality of which are assembled into a three dimensional growing structures that feature ultra-space compactness, spatial compression, as manifested by the growing organisms sharing all the space and nutrients in unique manners 3—The Macroscopic Farmer Efficiency: $\xi_f$ In agronomically advanced regions, conventional outdoor field farming, to be economically viable, requires a minimum average farm size to be about 250 hectares and benefits from advanced farming tools to enhance yield and reduce labor cost. These tools aid in performing several functions including: soil preparation, planting, irrigation, application of pest controls and harvesting.

In addition to spatial constraints imposed by these tools to function effectively, the farmer makes certain decisions as to what to plant, what nutrients to buy, from what source, and the quantities and timing of applying these resources, and timing decisions to carry out the farming activities. These collectively are reflected in the farmer's efficiency parameter $\xi_f$, which is considered a loss since the decisions and their timing are never perfect (human errors) and depend on certain unpredictability of the weather conditions.

This is an opportunity for enclosed controlled environmental indoor farming, according to aspects of the present invention, to achieve a gain factor that enhances $\xi_f$, resulting from more accurate unambiguous optimized decisions timing, and optimized dispensing of nutrients.

This emphasis on many aspects of $\xi_{macro} = \xi_{sp}\xi_t\xi_f$, presented herein, is to our knowledge, done for the first time, by Applicant pursuant to the present invention. Large gains ranging from 10 to 100, and may even exceed 100, will be shown to result from the inventive features of the present invention.

III.5 Plurality of PGM Efficiency Control Options to Satisfy AgriPAL

As discussed above, the conventional outdoor field farming dependence on the sun and soil deprived agronomist from having access to many of the physiological and physical loss mechanisms embodied in the PGM descriptions given by Eq. (5) repeated below.

$$\eta_E = \xi\phi = \xi\prod_{i=1}^{n} S_i \quad (5)$$

$$\phi = \prod_{i=1}^{n} S_i = S_m S_l S_{ll} S_{ev} S_{Br} S_{photon} \quad (5a)$$

$$\xi = \xi_{sp}\xi_t\xi_f \quad (5b)$$

Consequently, Agronomists have had no ability to control these parameters.

Thanks to AgriPAL condition in Eq. (2) a clue as to how and why conventional farming achieved economic viability was revealed by means of the outdoor economic viability index: $EVI \equiv g_{sol}\eta_E$.

AgriPAL has also been the catalysis behind the ability to make sun-less, soilless indoor farming viability for staple crops. Much higher profit margins can also be achieved for the production of non staple crops, by requiring the need for an indoor economic viability index: $EVI^e \equiv \eta_E^e \equiv g_e\eta_E$ which is the object of many embodiments of this inventions and related co-pending applications. The transparency of the energy conversion efficiency components gained from the PGM enabled the realization of several gain components $EVI^e \equiv \eta_E^e \equiv g_e\eta_E$ that satisfies AgriPAL thus:

$$\eta_E^e = \xi^e\phi^e = \xi^e\prod_{i=1}^{n} S_i^e.$$

-continued $$\xi^e = G_\xi\xi$$

$$\phi^e = g_\phi\phi = \prod_{i=1}^{n} g_iS_i = \prod_{i=1}^{n} g_i\prod_{i=1}^{n} S_i$$

$$g_e = G_\xi g_\phi$$

$$\eta_E^e = g_e\eta_E$$

$$g_\phi = \prod_{i=1}^{n} g_i$$

$$g_\phi = \prod_{i=1}^{n} g_i = g_m g_I g_{II} g_{env} g_{Br} g_{photon}.$$

$$g_m = g_{CO_2} g_{H_2O} g_{O_2}$$

$$g_I = g_N g_P g_K$$

$$g_{II} = g_S g_{Ca} g_{Mg} g_{Mn} \cdots g_{Cu}$$

$$g_{Br}$$

$$g_{env} = g_{soil} g_{pH} g_T g_{weather} g_{pest}$$

$$g_{photon} = g_\lambda g_t g_{sp}$$

$$G_\xi = G_{sp} G_t G_f$$

$$\eta_E^e = g_e\eta_E = g_\phi G_\xi \eta_E$$

$$g_e = g_\phi G_\xi = (G_{sp} G_t G_f)\left(\prod_{i=1}^{n} g_i\right)$$

Gain Control Options:

It has now become possible to examine the complete portfolio of gain parameters given by $$(G_{sp} G_t G_f)\left(\prod_{i=1}^{n} g_i\right),$$

to provide engineered solutions, options, designed and optimized to achieve desirable indoor sun-less, soilless, SanS-Soil farming. Such a control has heretofore not been possible.

Figure 3A:
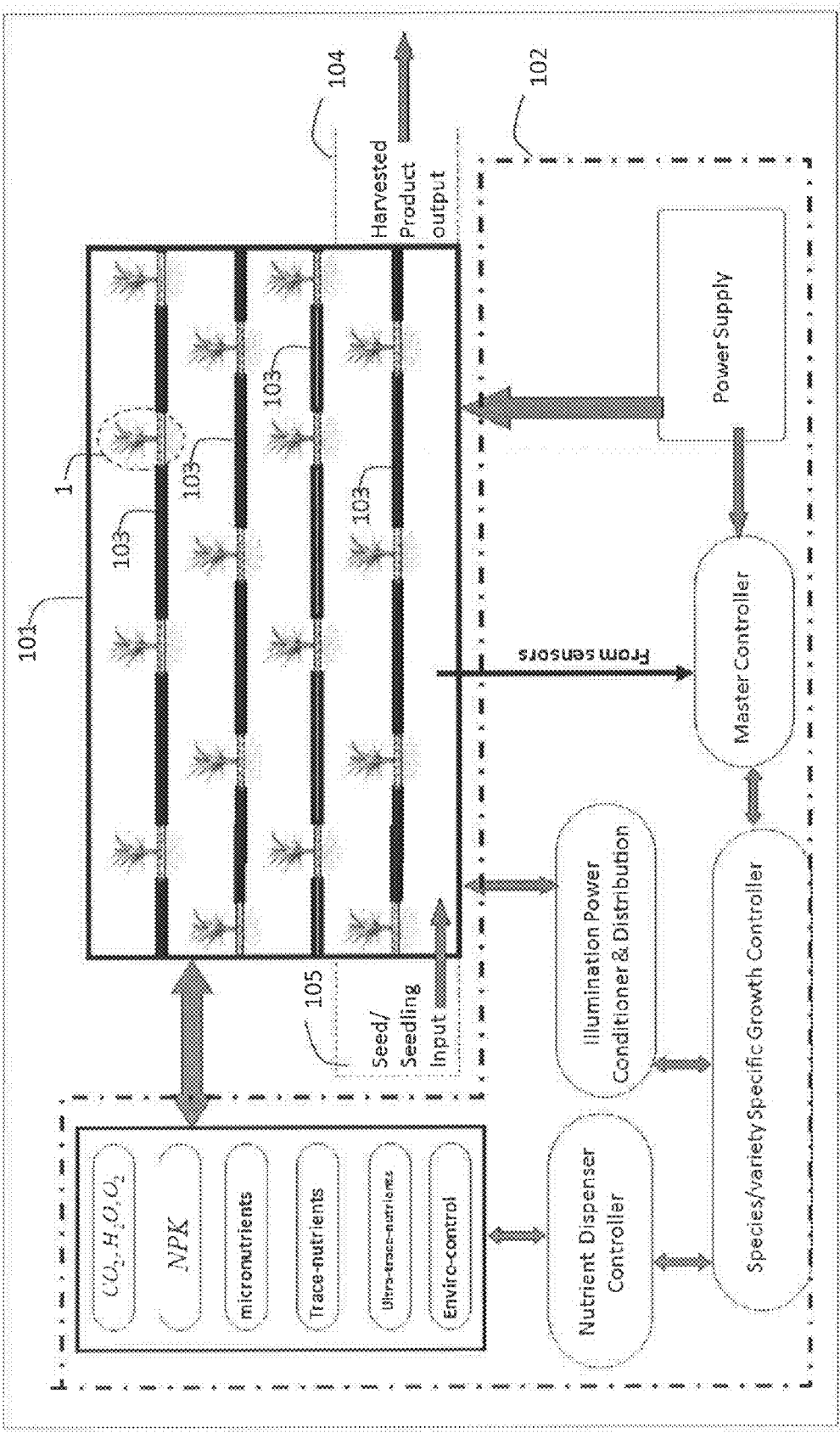
FIG. 3A shown a SanSSoil indoor farming system comprising a protected environment for sustaining plant growth, and a control subsystem that follows a program to control the growth trajectory so as to maximize gain, the economic variability index, EVI and profitability.

FIG. 3A is an exemplary depiction of an indoor SanSSoil farming system 100 comprising a SanSSoil sheltered and protected controlled environment 101 and a control subsystem 102. The SanSSoil sheltered and protected controlled environment 101 is designed to be substantially impermeable to pests, and undesired gases, liquids, particulates, and other foreign objects. Preferably said protected environment is well insulated and protected from outside temperature swings in order to maintain a desired temperature that is most suitable for growth and results in maximum productivity.

In certain situations, solar radiation may augment artificial light for photosynthetic growth. In this case the SanS-Soil environment 101 may be equipped with filters to filter out unwanted solar wavelengths including ultra-violet, infrared and certain visible wavelengths.

The hybrid growth method based on the combination of artificial lighting, preferably LED, with selected solar wavelengths will enable the maximization of $g_e g_{solar}$, viability index and the profit margins established through meeting the AgriPAL condition.

The SanSSoil environment also comprises structures for handling seed/seedling input 105 harvested product output.

Said structures are preferably designed to incorporate appropriate sealing structures such as load locks in order to maintain sterile or near sterile conditions. Means to achieve impermeability and sterility of SanSSoil edifices are well known to persons skilled in the art. Internally, the SanSSoil environment 101 houses a plurality of SanSSoil plant culture layers 103 disposed in a three dimensional space. The SanSSoil plant layers are made form structures and materials that are optically transparent. This will enable the layers share and recycle unabsorbed light, thereby increasing the light energy utilization efficiency.

The control subsystem 102 is programmed to control all aspects of growth physiology to achieve economic viability by ensuring that $$EVf = g_e \eta_E = (G_{sp} G_t G_f) \left( \prod_{i=1}^{n} g_i \right) \eta_E$$

approaches 1 in order for AgriPAL condition to be satisfied. Each gain parameter in the portfolio has an optimum range that gives the maximum value. This is adjusted by the subsystem 102 for each species. The upper and lower limits of this range are determined experimentally in optimized environmental parameters.

In some situations, a group comprising more than one interacting parameters, may be adjusted and optimized together. For example, adjusting the carbon dioxide to an optimum value limited by the dark reaction enzyme density requires adjusting the light level until it is limited by the light reaction enzyme density. The steps of optimization are aided by appropriate sensors which communicate with the controller values to require adjustments.

Figure 2:
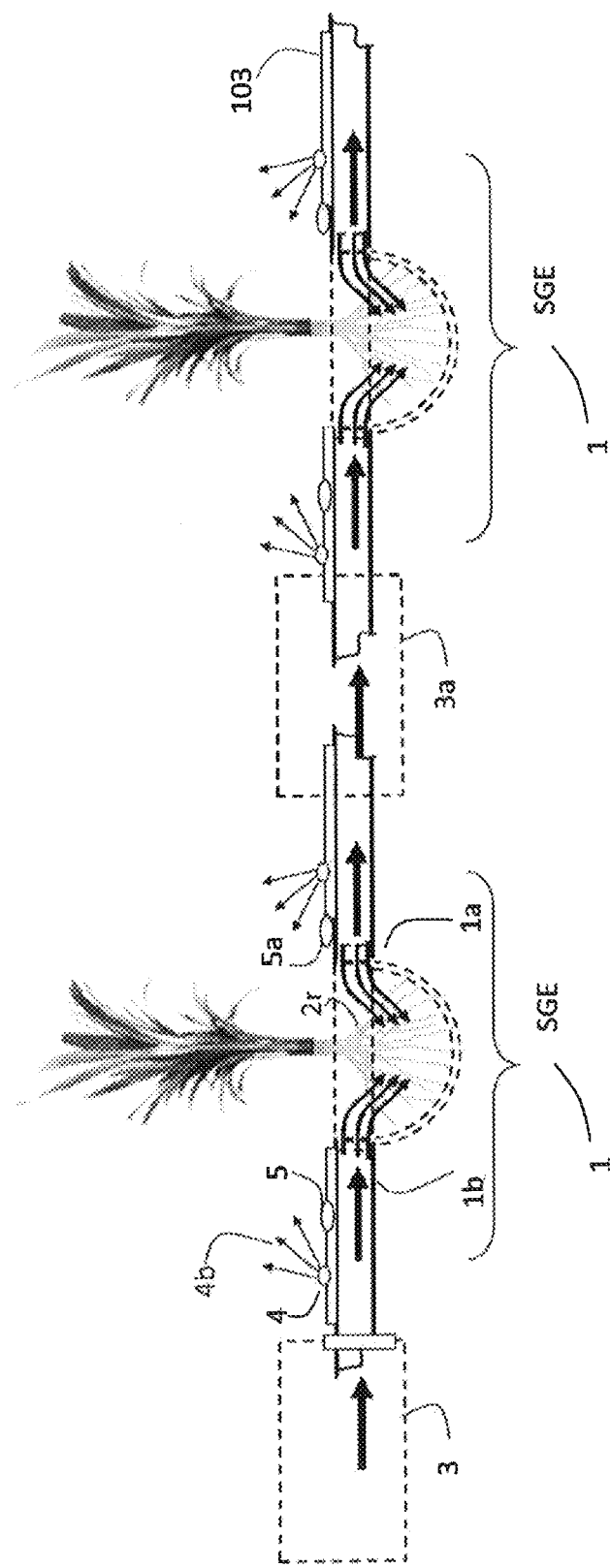
FIG. 2 illustrates the details of one of a plurality of SanSSoil Growth Elements, SGE, supported and sustained by a 3D multilayer structures within the protected environment.

Each layer 103 within the SanSSoil environment 101, is so designed to sustain the growth of plants or organisms in integrally made SanSSoil growth elements (modules), SGE 1, described further in FIG. 2. The layers 103 and the plurality of SGE's are spaced in such a manner that optimizes the space utilization efficiency $G_{sp}$.

Each SGE 1, comprises integrally made structure 1a, 1b which houses the plant 2, the shoot 2s, and the root 2r, and connected to a nutrient sources 3, 3a. The nutrients drip or spray downward on the root in the cup like substructure. One key aspect of the present invention is to combine this method of feeding, with foliar feeding, well known in the art, by means of fogging subsystem (or mist) which preferably supplies micron scale fluid particles (droplets) that are absorbed directly by the plant leaves, by-passing root uptake. Each SGE 1, optionally and integrally comprises a light source 4, and a sensor 5.

It is also possible to have two fogging systems, one for supplying one set (a first set) of nutrients to the root and a second supplying different nutrient set to the leaves. In addition to providing more that one feeding sources, it is contemplated that in certain situations, said source may be applied sequentially, or in a temporally pulsed manner with adjustable periods and duration. This inventive feature is unique to indoor farming, according to the present invention, because it affords a new degree of freedom for the subsystem 102 to control the components of gain factor $g_e$, through optimization of the operating range of each component. This is especially advantageous when two sets of nutrients are antagonistic to each other, competing to prevent the optimum pH to establish for maximum beneficial uptake.

This Applicant's Co-pending patent application U.S. patent application Ser. No. 13/887,334 entitled "High Density Three Dimensional Multi-Layer Farming System and Method", concurrently filed with the present Application, is incorporated herein by reference in its entirety, and describes in more detail three dimensional architectures that feature several examples of compactness and high space utilization efficiencies including: transparent layers 103 and SGE's 1 to recycle light to minimize wasted light, the overlap of root space and shoot space to minimize wasted space, and to provide more than one root and leaf feeding options.

Figures 3B, 3C:
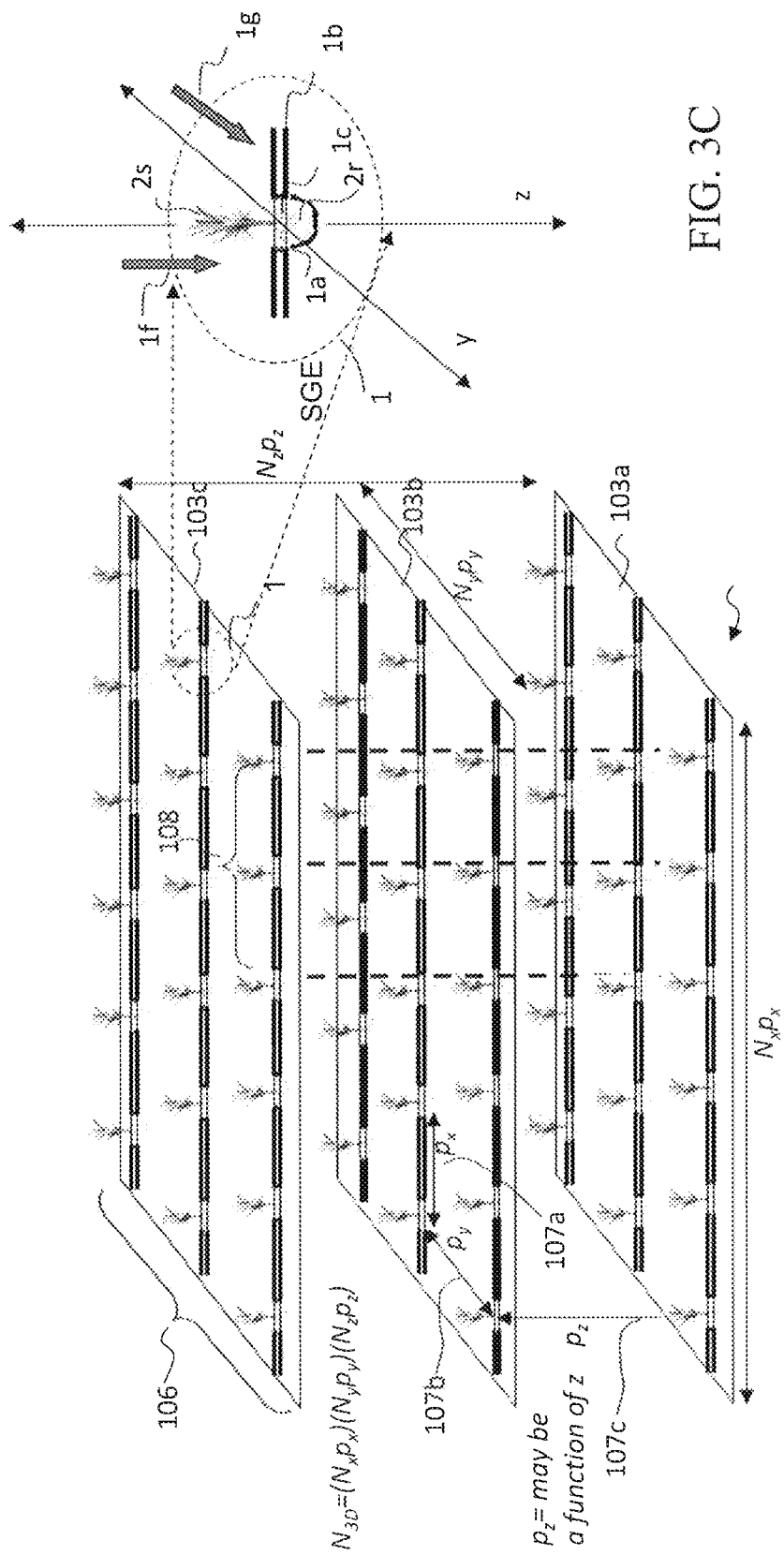
FIG. 3B-3C shows more details of the system 1, that is comprised of multilayer each of which comprises a network of strings of SanSSoil Growth Elements, SGEs. The graph shows the localization of each element in the 3D space, first, second and third spatial coordinates, and how they periodically repeat with periods px, py, pz.

In particular, FIG. 3B shows that in each of layers 103a, 103b, and 103b, the SGE's (FIG. 3C) are connected in strings 106, that are connected to nutrients sources delivered to each SGE site. In the first spatial coordinate, x, the SGE repeat at period px, 107a, while the strings repeat in the second coordinate, y, at a period py, 107b. In the third spatial coordinate, z, the layers repeat at period pz, 107c. The dashed lines 108 depict columns of SGEs in there respective layers. The total number of plants in the 3D system, $N_{3D} = (N_x p_x)(N_y p_y)(N_z p_z)$, determines the over all 3D productivity of the system 100.

Figure 3D:
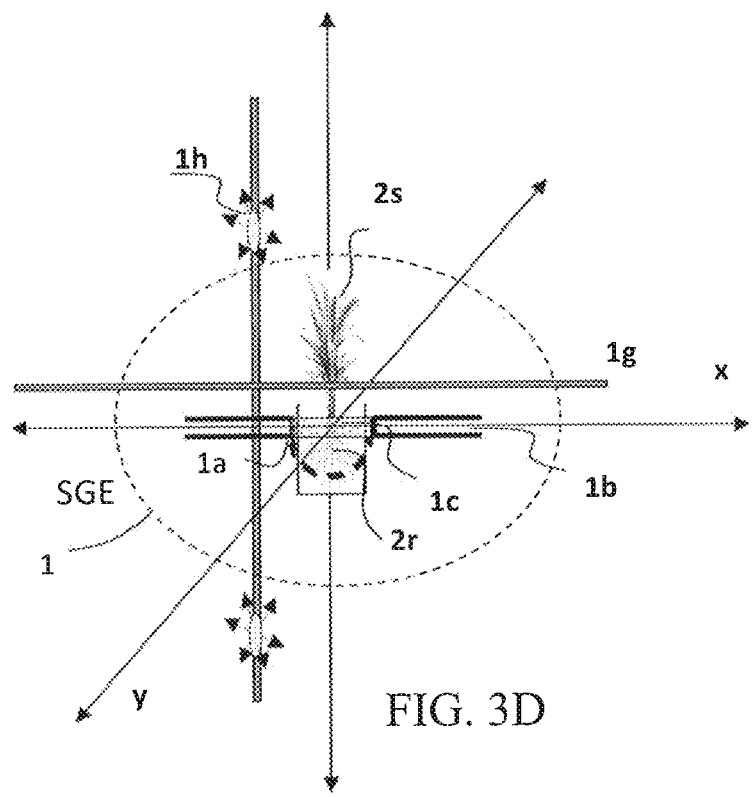
FIGS. 3D-3E describe more details how each SGE is made, its structures and function.
Figure 3E:
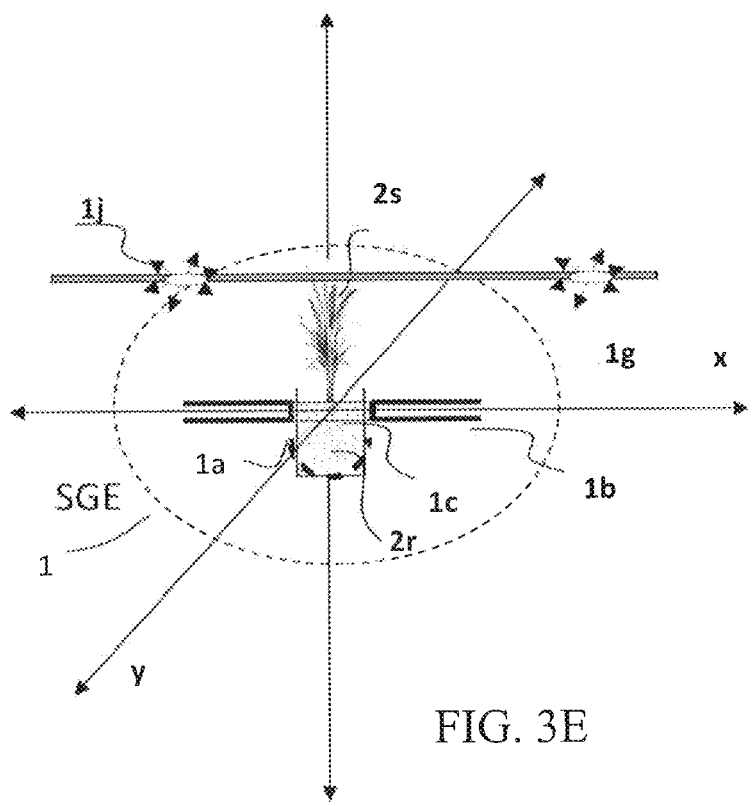

The illumination sources 1h, 1j and auxiliary sensors, 1g, or other resources, are disposed in any orientation relative to the three spatial coordinates, FIGS. 3C-3E.

As shown in FIG. 3F, a plurality of SGEs are connect as a linear string 111a, which is connected to a source 3. The connection structures are so designed to deliver with high conductivity nutrients to each site 1. Preferably, these structure are designed for quick connection to the SGE, enabling rapid and inexpensive and automated means to form a long string. These structures also have the strength to spurt the weight of the plants in the string. FIG. 3G show a cross section of the string.

In FIG. 3H, many strings 111a, 111b, are placed in parallel to form a layer 103. The cross section FIG. 3I illustrated an important feature of the present inventions which is the empty space between strings. This enables the sharing of nutrients, light that pass through between the strings and between the layers.

Figure 3J:
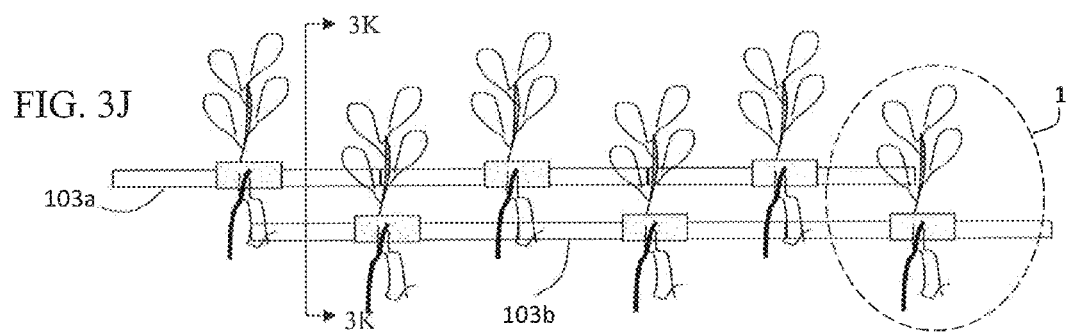
Figure 3K:
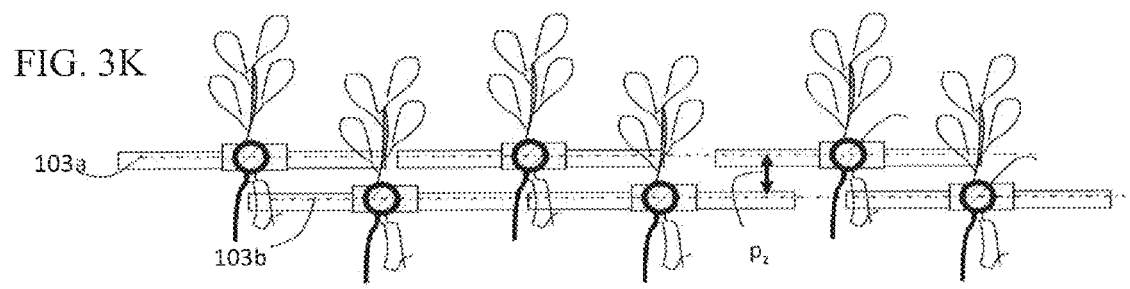

The advantages of the string interconnections is further highlighted in FIGS. 3J-3K wherein two layers 103a, 103b disposed vertically, each comprising a plurality of strings. One immediately notices the space saving in the cross section FIG. 3K where the plants of layer 103b, is in the space of the top layer 103a. The space between two layers is pz. It will be show later in a different embodiment that the period pz can be made to vary depending on the age of the plant manually or automatically.

Figure 4A:
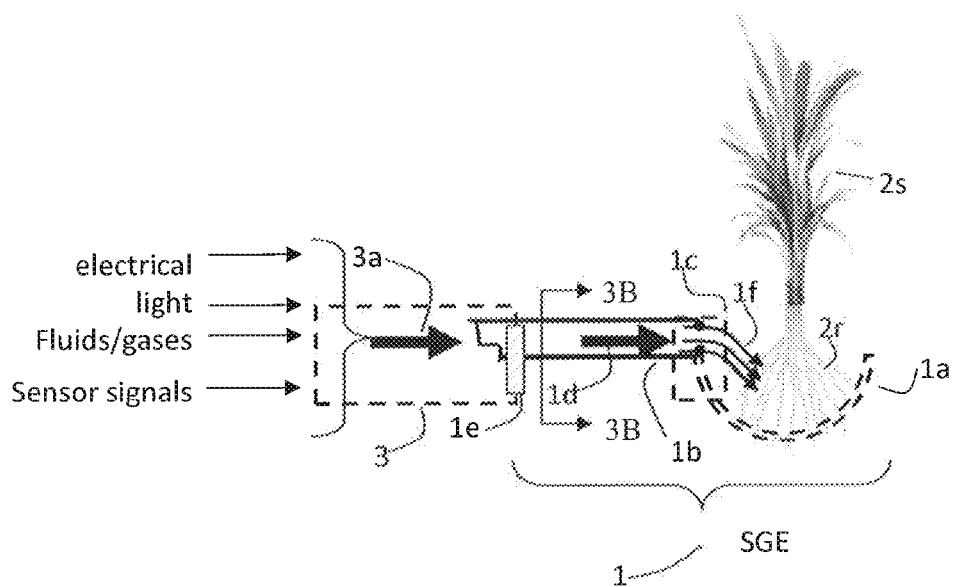
Figure 4B:
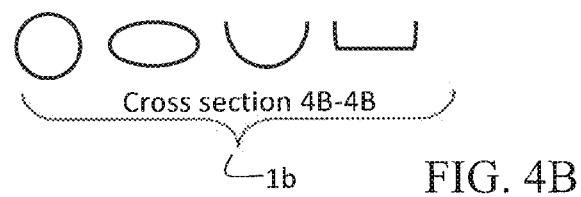
Figure 4C:
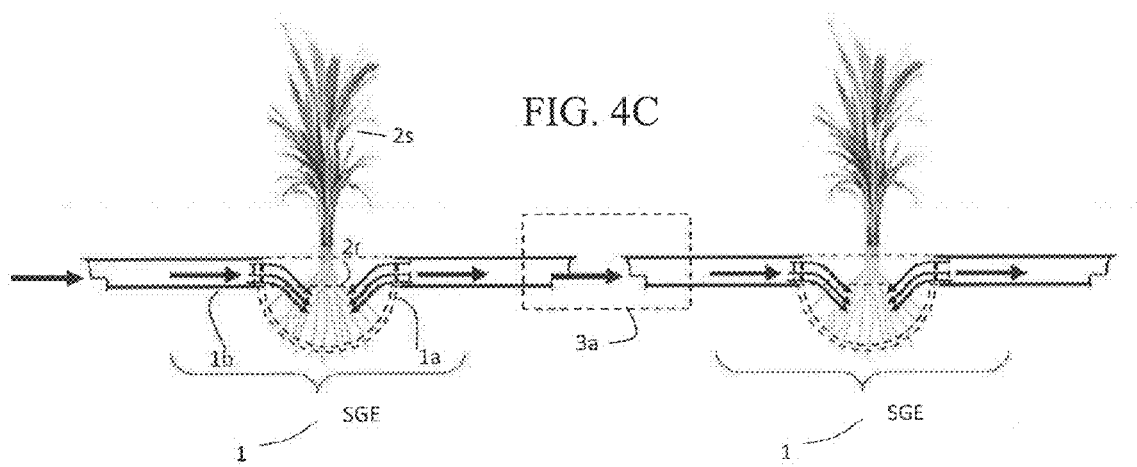
Figure 4D:
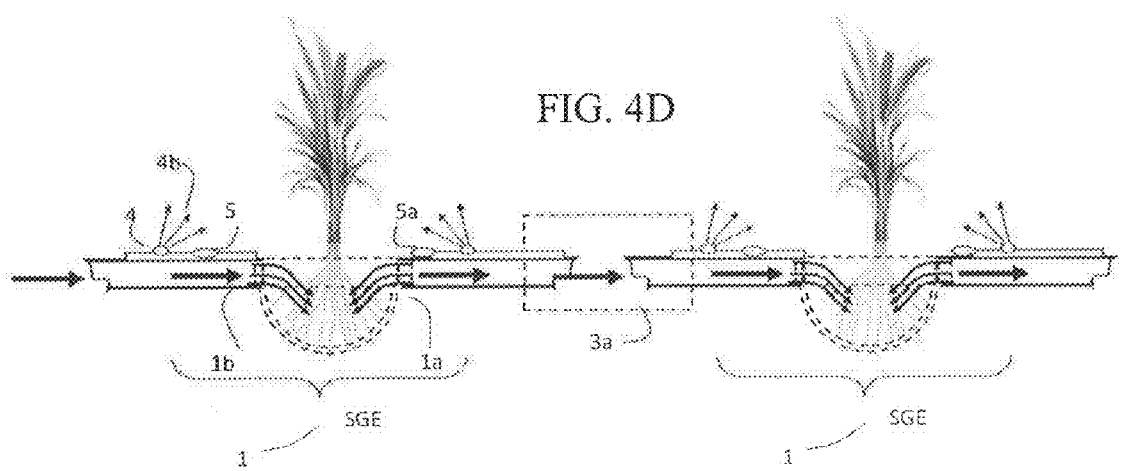
Figure 4I:
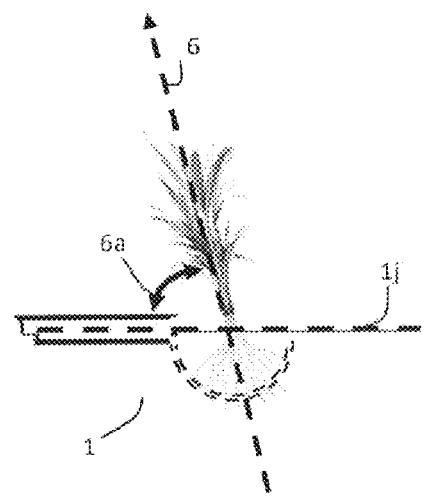
Figure 4J:
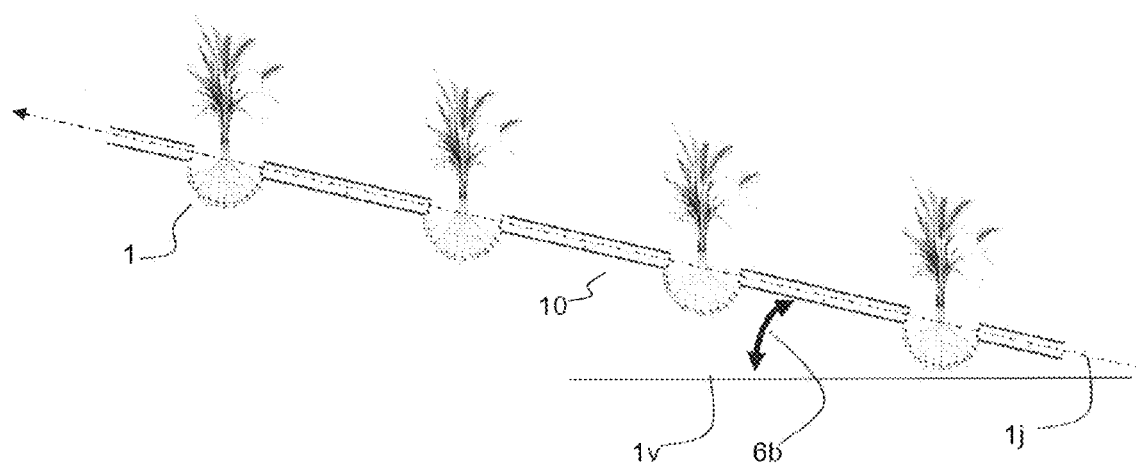
Figure 4P:
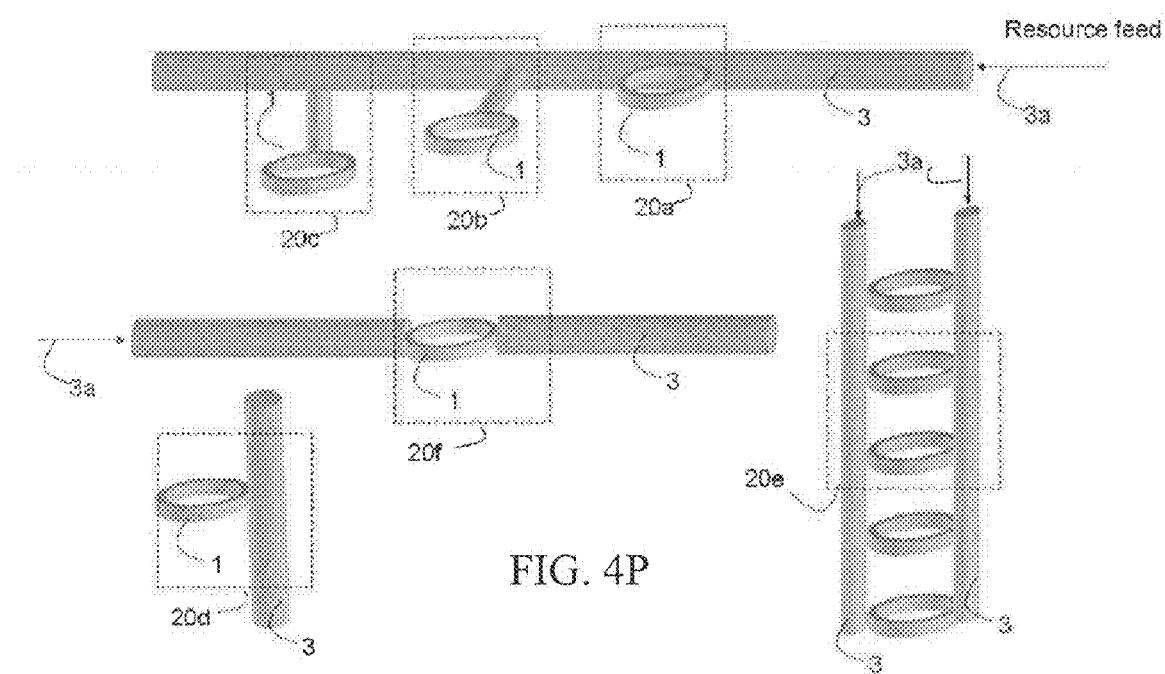
FIG. 4P show exemplary plurality of configurations to attach SGE to supply sources, and to neighboring SGEs.
Figure 5A:
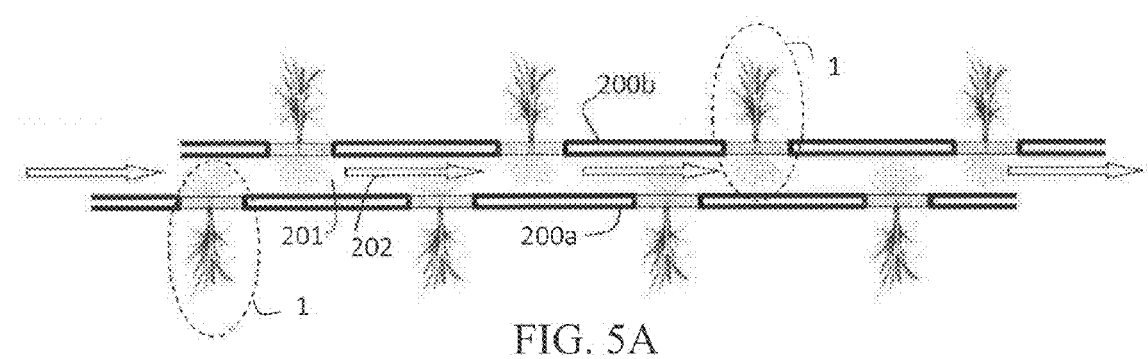
FIGS. 5A-5B illustrate SGEs allowing plants to grow upside-down
Figure 5B:
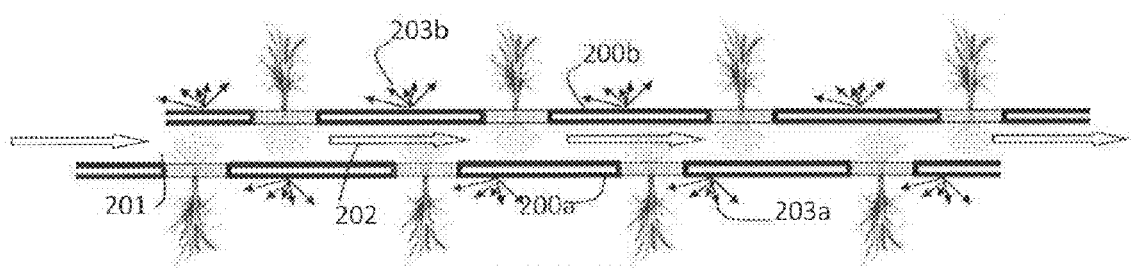
Figure 6A:
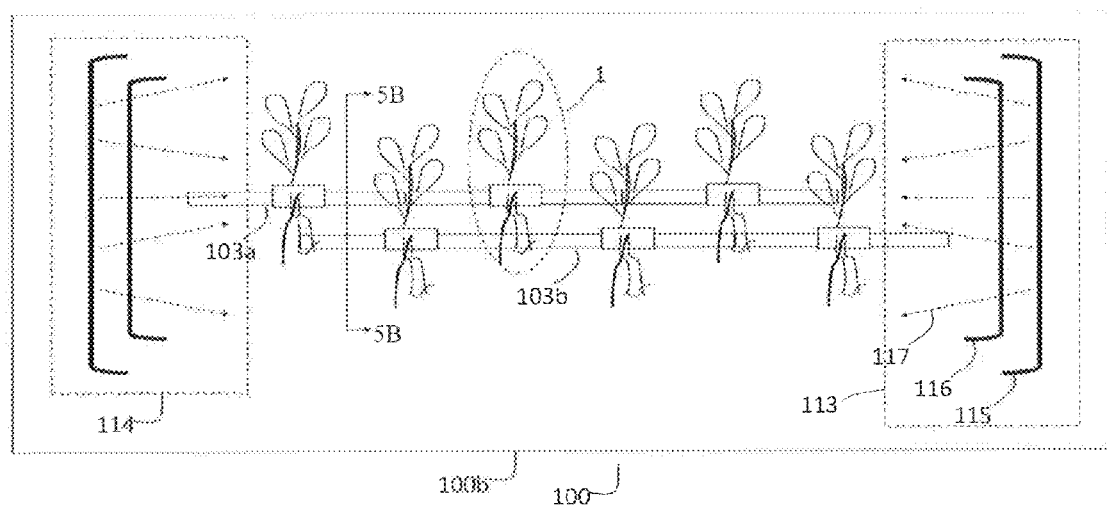
FIGS. 6A-6B illustrate delivery subsystems to multilayer SGE networked strings. These subsystems deliver light from the support walls of the main structure.
Figure 6B:
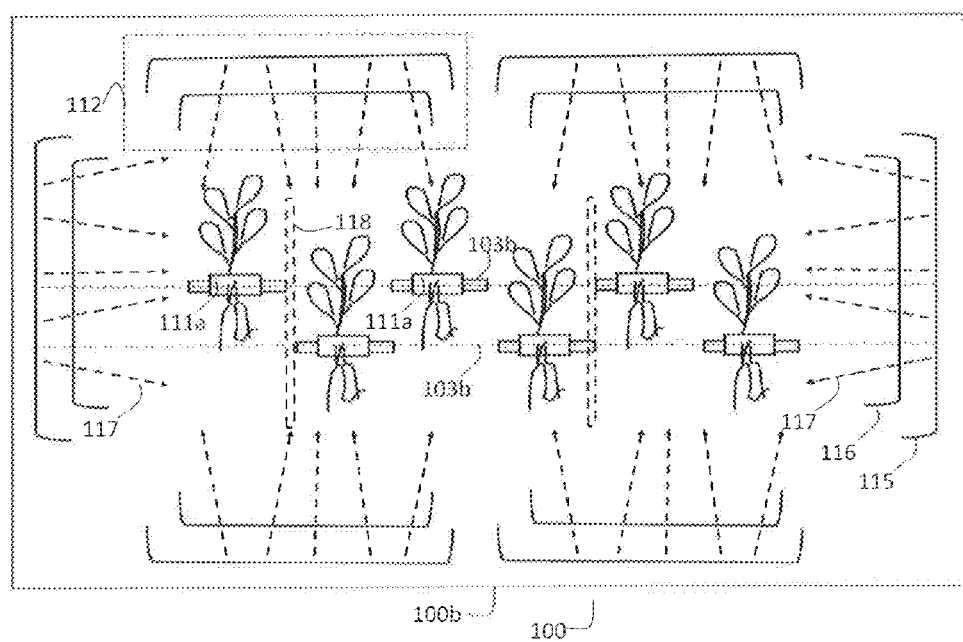
Figure 6C:
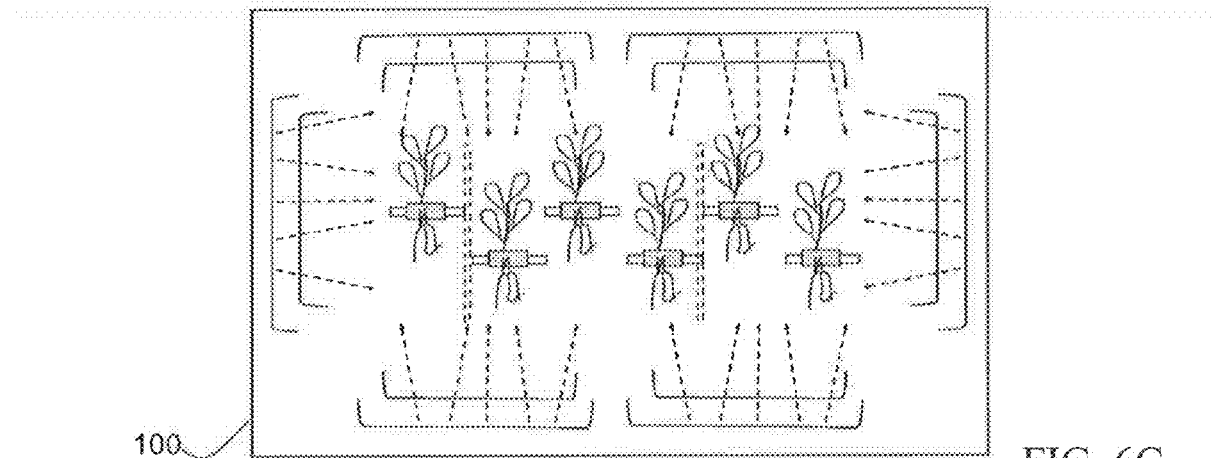
FIGS. 6C-6E show that main system housing protective structure designed to various sections.
Figure 6D:
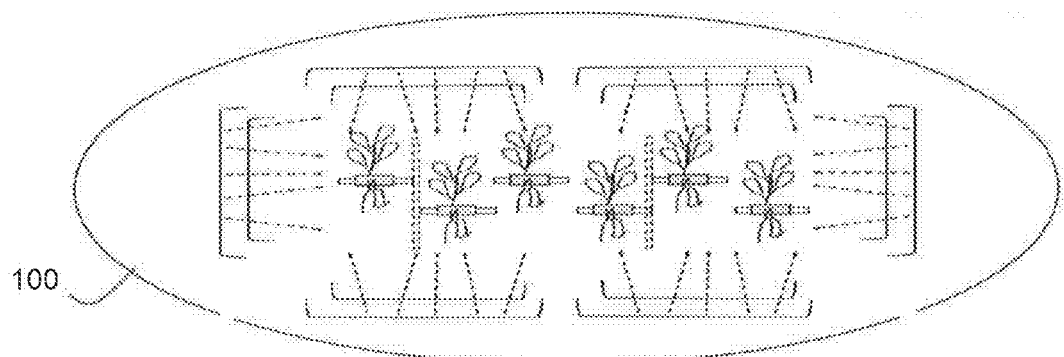
Figure 6E:
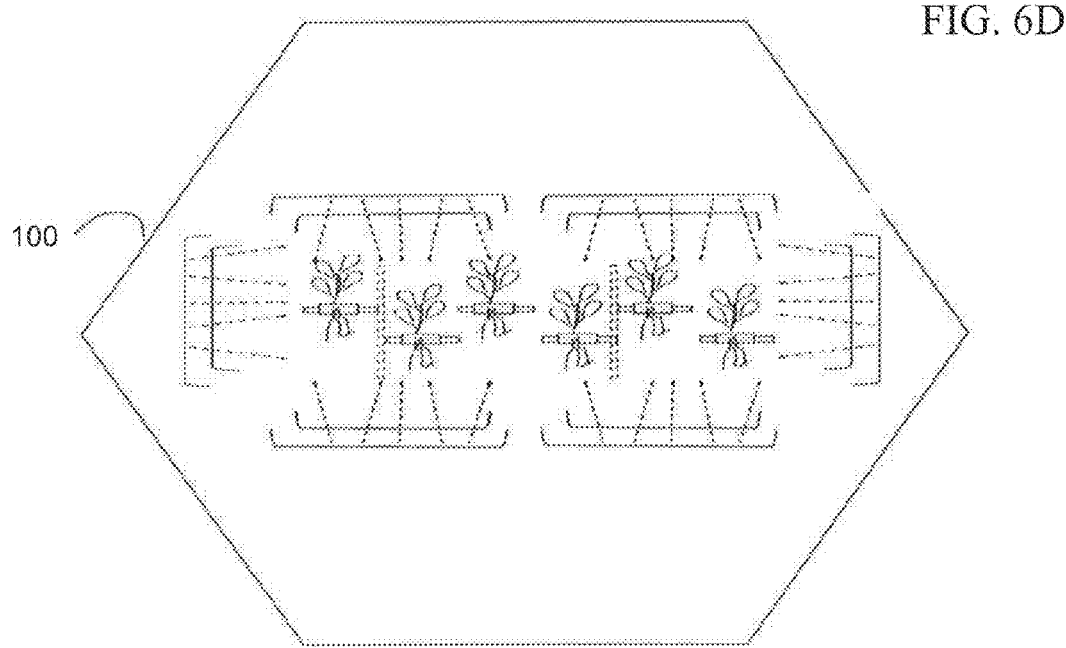

Now we provide in FIGS. 4A-4P more specific details of the construction of the SanSSoil Growth Element, SGE. The term integral multifunction is defined as a structure that comprises at least two substructures integrally made substantially permanently attached so as to carry out at least two functions. The preferred embodiment said functions are chosen from the group: {mechanical support, growth sustenance, germination, self-supplying nutrients, self-supplying light, sensing environment, communication nutrients to nearest neighbor}.

The SGE in FIG. 4A comprises growth compartment or substructure 1a which mechanically and physiologically supports the growth of the root 2r and the shoot 2s to maturity. The substructure 1a is integrally attached to a connecting conduit 1b, that is in fluid communication with growth substructure 1a, through orifice or opening 1c. Fluid 1d, flows through said orifice 1c, supplying a stream 1f to the root. Conduit 1b may have any cross section as shown in FIG. 4B.

Conduit 1b is removably attached to at least one source 3. Said attachment is preferably quick connect disconnect type with sealing function to prevent leakage, 1e. The source 3 provides essential resources, ingredients, to optimally sustain plant growth. Said resources comprise at lease water and nutrients, but may also conduct and deliver light by means of total internal reflection mechanisms, well known in the fiber optic art and the back-light sources well know in the liquid crystal display art. The conduit may conduct electrical signals or power from sensors and to local LEDs integrated directly into the conduit 1b.

Conduit 1b according to FIGS. 4C-4D, serves to connect two SGEs to form strings as described above, FIGS. 3F-3K, and to pass resources 3a from one SGE to another. Said resources include fluids, conducting signals from sensors 5, 5a, and energizing LEDs 4, to provide illumination 4b to local plants.

As shown in FIGS. 4E-4H, the SGE in the preferred embodiment also comprises a seed support structure 1m, which functions to mechanically support the seed 2, and to provide the optimal environment for high germination rate. By following the arrows in the figures, we show the emergence of the shoot 2a and root 2b to growth of the seedling and finally the mature plant. This emphasizes the significance of the integral construction of the SGE according to this preferred embodiment highlighting the capability multi-functions which comprise: mechanical support of seed and mature plant, germination, local nutrient delivery, local delivery of light, environment sensing, and growing plant to maturity, FIG. 4H.

The multi-function integral construction of SGE, also highlight the local self-sufficiency of each SGE, that plays a significant role in maximizing 3D space utilization efficiency. It also serves to make its distinction clear, relative from prior art plant growing practices described above in connection with FIGS. 1A-1H in my Co-pending patent application U.S. patent application Ser. No. 13/887,334.

Since the plants follow the light direction, we can advantageously exploit this property to orient the plant growth in any desired direction as illustrated in FIG. 3I, wherein the growth axis 6, makes an angle 6a with respect to the layer axis 1j. In other embodiments, the whole string and plane, 10, may be oriented at an angle 6b with respect to the horizontal direction 1v, FIG. 4J.

Yet in other embodiments, it is preferred to make strings that are hanging from top to bottom, 11, 12, with SGE oriented in desired directions determined by the light as shown in FIGS. 4K-4M.

In addition, there are system optimization benefits to interconnect SGE string in the form of a network, 13, FIG. 4N, that combines series and parallel combinations of strings attached to feeding structures, 14, 15, which receive resources 16, 17 from a master delivery system (not shown). The benefits of this arrangement include: increasing speed and flexibility of system assembly, reducing infrastructure cost, and optimizing consumable utilization efficiencies.

Integrally made multi-function self-sufficient SGE may be attached to feed structure, or string interconnection sutures, 3, in a plurality of desired configurations, 20a-20e, shown in FIG. 4P, depending on the plant species and system design requirements. Persons skilled in the art may produce other configurations, without departing from the SGE network interconnectivity claimed by the present invention.

In conventional outdoor farming, the shoots, stems, and branches are constrained to grow upward in the direction of sun light, and the roots are constrained to grow downward in the soil where the water and nutrients reside, one embodiment of the present invention enables the SGE's to the plants upside down, as shown in 5A-5B. This is a benefit of the present invention that abandons the soil and can grow in artificial light that may emanate from any direction including from the bottom upward.

Layers 200a and 200b comprise strings SGE 1, the bottom of each share the same space 201. Conveniently, the space 201 shared by the roots becomes the conduit to supply the nutrients 202 in the direction of the arrow. While the string interconnections energy the LEDs to supply the illumination 203a, 203b.

The system 100 illustrated in FIG. 3A and discussed above, revealing its various components and subsystems, 100a, is the embodiment of a complete self-sufficient 3D SanSSoil growing system for food, biofuel, and a plurality of plant made materials for industrial and medical applications.

The integral SGE interconnected networked of 3D strings are supplied with (fed) required resources (nutrients and light) to sustain optimum growth by a plurality of methods including: direct connection of each string to sources, fogging, spraying and a combination thereof. FIGS. 6A-6E illustrate non liming examples of systems enclosures geometrical configuration, 100, 100b in relation to the feed subsystems, 112, 113, 114, 115, 116 delivering streams 117 fluid and light from all sides and optionally from the top and bottom.

The self-sufficiency and modularity of the contemplated system will enable easy scale up to larger production volumes, once a module is optimized in terms of yield, productivity per unit volume, resource utilization efficiency and low production cost. A scaled up production system comprising plurality of modules that may be stacked vertically to any desired height, the "sky is the limit", the ultimate potential of 3D agriculture, realizing the goal of food and energy security with no resource competition.

The SanSSoil method for indoor growing plants and other photosynthetic organisms comprises the following steps:
1. Providing substantially impermeable environment 101.
2. Providing at least one growth layer, 103 capable of sustaining growth of plant a plant specie, and comprises at least on integrally made SGE 1, for example as in FIG. 2B.
3. Providing seeds to be germinated in at least one SGE to establish a seedling that is viable for further growth, or alternatively, providing at least one seedling that is fixed in an SGE to adapt and become viable for further growth.
4. Providing light having optimized wavelength, intensity, and temporal characteristics.
5. Selecting a program stored in the control system that comprises optimized temporal steps, and parameter values for the plant specie, which is designed to give an optimum growth trajectory for the desired product.
6. Activating the control system to start the growth protocol for the desired specie.
7. Monitoring the growth conditions by means of sensors to enable the control system make adjustments, as needed, follow the designed growth trajectory.
8. Harvesting the products
9. Repeating the cycles for either batch mode culture or continuous culture.

The SanSSoil method further comprises the steps:
a. Varying the parameters in $$EVF = g_e \eta_E = (G_{sp} G_t G_f) \left( \prod_{i=1}^{n} g_i \right) \eta_E,$$

b. Establishing the optimum range, minimum and maximum values for each for each parameters
c. Recording and storing said optimum ranges for each species.
d. Providing a program which incorporates said optimum ranges and established the growth trajectory for each species that leads to harvesting the desired product
e. Loading said program into system controller 102
f. Commanding programmed system controlled 102 to execute steps 3 through 9.

This is an exemplary method that harnesses the principles and the premises of the invention described herein. More specifically, the use of AgriPAL, in conjunction with the detailed physiological parameter transparency given by $$EVf = g_e \eta_E = (G_{sp} G_t G_f) \left( \prod_{i=1}^{n} g_i \right) \eta_E$$

to profitably produce food and plant derived fuels and other materials. Therefore, the steps described should not be limiting, for skilled practitioner may conceive improvements that do not depart for the inventive methods, means, principles and features.

FIGS. 1A to 1H provide exemplary experimental illustrations of the ability to control the growth and gain parameters of various species obtained by Applicant. Li-COR 7400XT photosynthetic instrument system has been used to determine the photosynthetic responses to various parameters including: temperature, humidity, CO2, oxygen, light intensity (PAR), pulsed illumination at various frequencies, and duty cycles.

FIGS. 1A-1C measures the responses of two lettuce cultivars and strawberry, as light intensity and CO2 levels are varied. This confirms the well known saturation levels that are determined and limited by the microscopic cellular enzymatic biochemical reactions discussed above. The measurements confirm one of the premises of this invention that in indoor farming increases in CO2 and light intensity to levels higher than conventionally available for outdoor farming, results in higher plant productivity. This validates the conclusion that plants are underutilized in the outdoors, i.e., they have much higher capacity that practically realizable due to the sun and soil constraints.

Figure 1D:
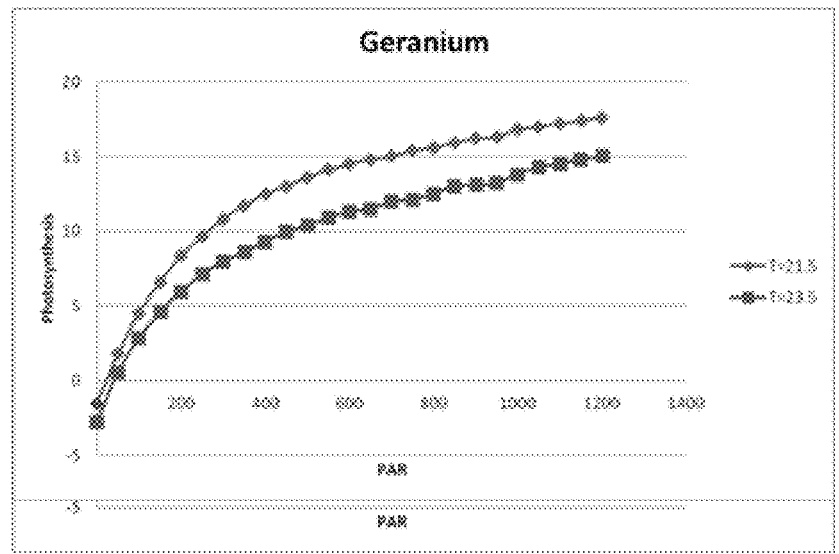
FIG. 1D is an illustration of the fine temperature control and its impact on the saturating response of photosynthesis.

In outdoor farming, the temperature may vary widely daily and seasonally from −20 to 40 degrees Celsius limiting the control over plant productivity. On the other hand, FIG. 1D illustrates the fine temperature control available to indoor farming. In this example the graph shows the measurable difference in response to a 2 degrees temperature change. This validates the ability to hold the temperature fixed at a value that achieves maximum productivity, and gain factor for particular specie.

Figure 1E:
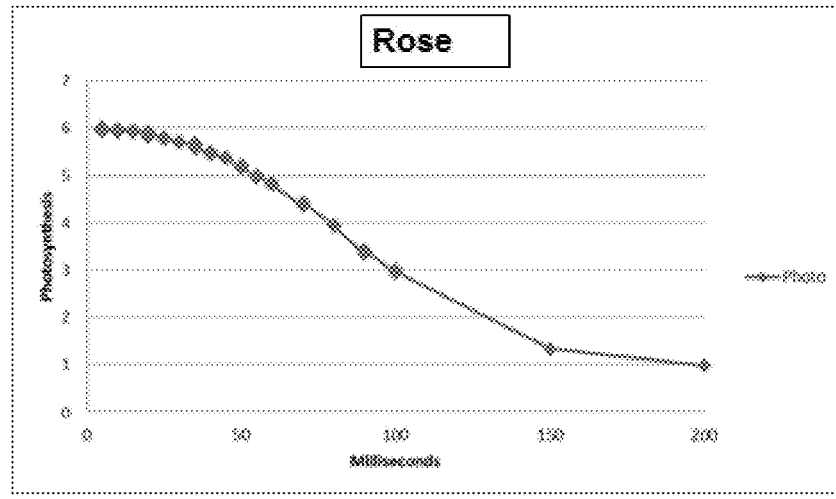
FIG. 1E shows the photosynthesis response of pulsed illumination at different periods, revealing a high cut off frequency analogous to a high pass filter.

In our PGM the temporal gain component $g_t$ is incorporated, revealing transparently, the enzymatic dynamical contribution to plant growth efficiency that has been omitted in prior model in Eq. (1). FIGS. 1E-1H is experimental illustrations and validation of temporal control according to the present invention. FIG. 1E shows the response of a rose to applied pulsed illumination of LED at 860 nm, 50% duty cycle, as the period is varied from is varied from 5 millisecond to 200 millisecond. The response drops off from 6 to 3 at 100 ms (~10 Hz) which reveals the speed of the Calvin, dark reaction. This behavior is analogous to the cut-off frequency of high pass filters in we known in the electronics circuits art.

At the high end of the frequency spectrum, the plant behaves as a low pass filter, giving a photosynthesis response only below frequencies in range of 200-300 Hz. The LED source at 860 nm is designed to deliver a train of high intensity light pulses of width $\tau_{pulse}$ and period $\tau_{period}$ allowing the duty cycle in percent: $dc \pm [100(\tau_{pulse}/\tau_{period})]$ to vary from 100% to 0.1%.

Figure 1F:
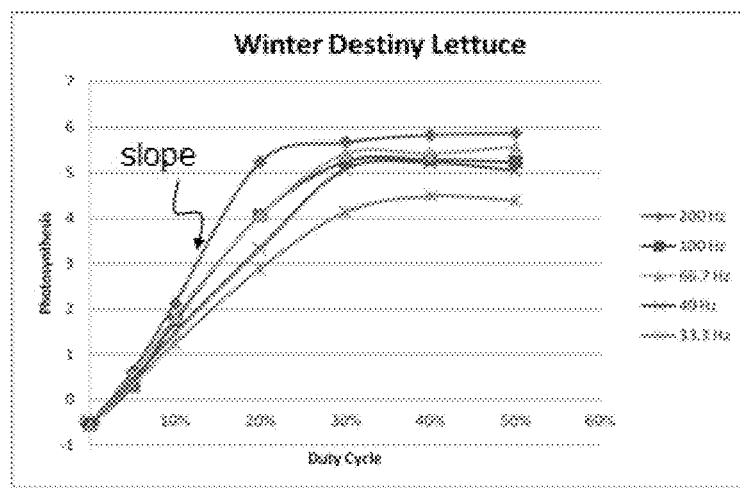
FIGS. 1F-1H illustrate the photosynthetic temporal responses of various plants under pulsed illuminations, revealing temporal gain factors ranging from ~3 to ~10.

FIG. 1F is an exemplary graph of Winter Destiny Lettuce photosynthesis response to duty cycle fro defect frequencies $(1/\tau_{period})$. What is striking is the revelation that at 200 Hz, the response at 50% is the same as for 20%. This is a measure of temporal losses which prior art model could not account for. According to the present invention, this loss is reversed as $g_t \sim 5$, as can be measured from the slope as a means for controlling the temporal parameters of the light source. This experiment also enables the measurement of the low pass cut off frequency and the speed limits of the light harvesting systems PS I & PS II. Note also that the gain is reduced as the frequency is decreased, showing the speed limit of the Calvin dark reaction of CO2 assimilation.

Figure 1G:
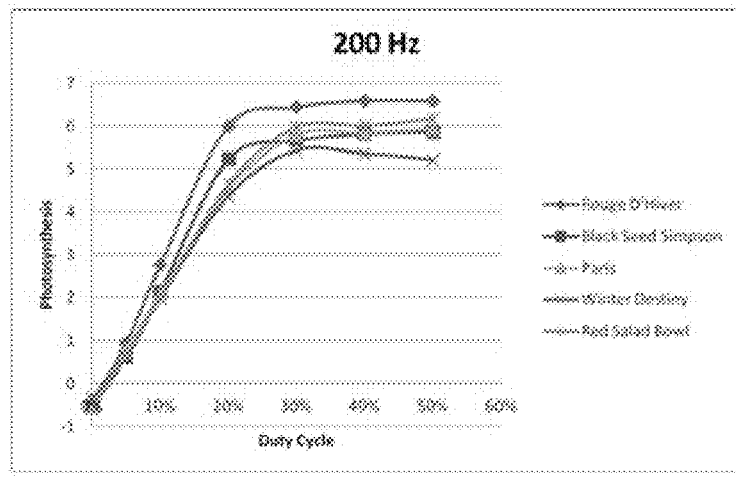
Figure 1H:
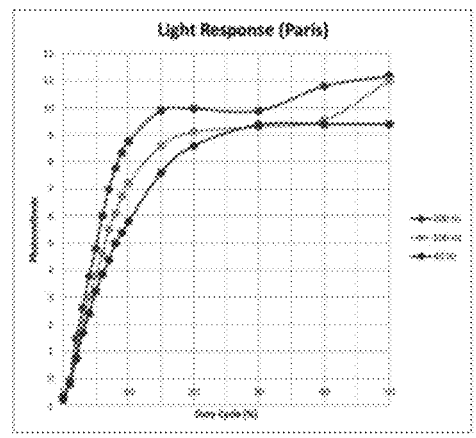

In FIG. 1G, the frequency is kept fixed at 200 Hz, and the duty cycle is varied for 5 lettuce varieties, indicating the same general behavior and showing temporal gain factors $g_t$ ranging from ~4 to 5. When humidity and CO2 levels were varied, the lettuce variety Paris revealed a gain of ~9 is possible. This temporal behavior, trait, has so far been repeated in all species tested, strawberry, broccoli, geranium, giving gains $g_t$ ranging from 3 to almost 10. These gains are related to the speed mismatch between light reaction and the dark reaction and they are correlated to the ratio $(\tau_{dark}/\tau_{light})$, and it the measure of efficiency losses which prior art could not account as discussed above.

This temporal seems to be evolutionarily conserved and is exhibited by all plant. Other investigators of plant response to pulsed illuminations have not measured gain:

https://mywebspace.wisc.edu/tsharkey/web/My_papers/
Tennessen%20Bula%20and%20Sharkey%20Pulsed%20light%201995.pdf http://www.google.com/
patents?id=Z4WUAAAAEBAJ&printsec=abstract&zoom=4#v=onepage&q=&f=false These prior art investigations either used light intensities well below the saturating intensity, where the efficiency is very high or have not been able to correlated or anticipate the temporal mismatch between the slow dark reaction and the fast light reaction. The gains measured according to FIGS. 1F-1G are obtained to adjusting the intensity to just below the saturating values, where photosynthesis to the highest value, and any losses should be revealed there. It is known in the art, that increasing the intensity well above the saturating level, leads to substantial photorespiration losses. The present invention maintains the intensity just below that level for achieve two benefit: maximization of the temporal gain factor and the avoidance of photorespiration losses.

Applicant's success in measuring the temporal gain, at least in part, validates model, PGM. It also shows that the temporal gain control is at least one vehicle that is now available, reliably, according to the present application, to increase EVI until profitability of indoor plant production is achieved according to AgriPAL.

The following are several additional examples of the degrees of control, afforded by the present invention, of specific groups of gain factors and their practically realizable values:

Example 1: $g_{photon}=g_\lambda g_t g_{sp}$, using this group, with pulse illumination farming, we can achieve a gains of: of $$(g_\lambda=2)(g_t=3)(g_{sp}=2)=12\times S_{photon}$$

or $$(g_\lambda=2)(g_t=10)(g_{sp}=2)=40\times S_{photon}.$$

Example 2: $G_2=g_\lambda g_{sp}G_{sp}G_f$, using this group in three dimensional multilayer farming, it is possible to achieve a gain:

$$(g_\lambda=2)(g_{sp}=2)(G_{sp}=10)(G_f=2)=80\times S_\lambda S_{sp}\xi_{sp}\xi_f$$

or $$(g_\lambda=2)(g_{sp}=2)(G_{sp}=30)(G_f=4)=480\times S_\lambda S_{sp}\xi_{sp}\xi_f \text{ or}$$

Example 3: combining the above options 1 and 2 to achieve gains ranging from 10 to 1000. If solar gain is also added in the case, gains exceeding several 1000 will be possible.

Example 4: $g_\lambda g_{sp} g_m g_{env} = g_\lambda g_{sp} g_m g_{soil} g_{pH} g_T g_{weather} g_{pest}$ Example 5: $g_\lambda g_{sp} g_m = g_\lambda g_{sp} g_{CO_2} g_{H_2O} g_{O_2}$ Other options will be described in connection with the embodiments that select groups and combination of groups selected from the complete portfolio $$(G_{sp}G_t G_f)\left(\prod_{i=1}^{n} g_i\right).$$

The above examples are not intended to be limiting. The methods of this invention include the steps of first determining the components, $$\eta_E = \xi\phi = \xi\prod_{i=1}^{n} S_i,$$

then determining the gain values selected from $\eta_E^e = g_e \eta_E = g_\Phi G_\xi \eta_E$ in order to engineer a design that achieves the optimum index $EVI^e \equiv \eta_E^e = g_e \eta_E$ that must satisfy the AgriPAL condition.

From Table 1 values of outdoor efficiencies 0.001 and 0.01 are not uncommon. Therefore, in controlled indoor environment, according aspects of the present invention, achieving gains, $g_e$ of 100-1000 are not unrealistic. However, laws of energy and mass conservation are strictly adhered to which restrict $g_e \eta_E \equiv EVI^e$ to be less than one. There are many ways of increasing $g_e$ to large values, but must always reach a limiting value (asymptote) such that the product $g_e \eta_E \equiv EVI^e$ may approach 1 but never exceeds 1. This would be enough to satisfy the AgriPAL condition of economic viability for all plants and other photosynthetic organisms grown indoors, including algae strains and cyanobacteria for biofuel production. Any increases in RCR such it exceeds 2, ensures economic viability for biofuel and staple food products. One the other hand other plant based products are always profitable since most of them have RCR>5.

For outdoor faming based on solar illumination, there may be the possibility that $g_{sol}\eta_E=EVI$ can exceed 1, without violating energy conservation law. This, for thousands of year, has ensured profitability through $g_{sol}\eta_E RCR>1$. This possibility stems from the fact that the cost of solar energy is zero, and over time we accumulate (store) energy in the form biomass chemical bonds, i.e., there exists enough solar energy to compensate of the inefficiencies of plants, and enough net energy is accumulated. It is possible that at least one seed germinates in the field, leading to growth to maturity with substantially minimum human effort or minimum other energy applied, such that $g_{sol}\eta_E$ is larger than 1. It may even be larger than 10. In the case of sugarcane, $g_{sol}\eta_E$ between 25 and 50 has been achieved. This is possible when $\epsilon_{other}$ in the denominator of $g_{sol}=\epsilon_{sol}/\epsilon_{other}$ is small or even vanishingly small, once again it is possible with sugarcane especially when some of its output energy is fed back to the field operation.

The invention claimed is:

1. A method for indoor growing of plants and other photosynthetic organisms to produce a desired product comprising:
   a. for a given species of plants or photosynthetic organisms, determining an enhanced economic viability index $$EVI^e = g_e \eta_E = (G_{sp}G_t G_f)\left(\prod_{i=1}^{n} g_i\right)\eta_E,$$

wherein
   $\eta_E$ is a physiological energy conversion efficiency characteristic of the given species;
   $g_e$ is a gain factor for indoor farming;
   $G_{sp}$, $G_t$ and $G_f$ are macroscopic efficiencies space utilization efficiency, temporal efficiency and farmer efficiency, respectively;
   $g_i$ are microscopic efficiencies;
   b. varying the microscopic efficiencies to establish optimum minimum and maximum values for each parameter, recording and storing said optimum minimum and maximum values for each parameter, and integrating said optimum minimum and maximum values in a program to give an optimum growth trajectory for the desired product;
   c. providing a substantially impermeable growth environment including
      i. a source of nutrients;
      ii. a source of light;
      iii. in an enclosed environment, a plurality of growth layers, each layer in photonic communication with the source of light and comprising a plurality of growing elements that carry out multiple functions and having a growth compartment that mechanically and physiologically supports growth of biomass; and a connecting conduit that is in fluid communication with the source of nutrients and the growth compartment through an orifice adjacent to the growth compartment, and structurally connects one growing element to a connecting conduit of another growing element, wherein the plurality of growth layers and plurality of growing elements on each layer contribute to the macroscopic space utilization efficiency $G_{sp}$;
      iv. a system controller;
   d. providing seeds or seedlings in each growth compartment on at least two of the plurality of growth layers;
   e. providing via the source of light and under control of the system controller light having optimized wavelength, intensity, and temporal characteristics, which contribute to the microscopic efficiencies $g_i$ as photonic efficiencies $g_{photon}$ as a product of spectral efficiency $g_\lambda$, microscopic spatial efficiency $g_{sp}$ and microscopic temporal efficiency $g_t$;

f. providing via the source of nutrients and under control of the system controller including main nutrients, primary nutrients and secondary nutrients, which contribute to the microscopic efficiencies $g_i$;

g. monitoring growth conditions with one or more sensors to enable the control system to make adjustments, as needed, to follow the optimum growth trajectory; and h. harvesting products from the growth layer.

2. The method as in claim 1, wherein the spacing between layers is characterized by a period, and wherein said period varies according to maturity on adjacent growth layers.

3. The method as in claim 1, wherein the enclosed environment and growing elements are formed substantially non absorbing to light.

4. The method as in claim 3, wherein the growing elements are substantially transparent to light.

5. The method as in claim 1, wherein steps (b) and (f) use a fogging system.

6. The method as in claim 1, wherein steps (b) and (f) use foliar feeding and root uptake feeding.

7. The method as in claim 1, wherein the main nutrients include water and CO2, the primary nutrients are nitrogen, phosphorous and potassium, and the secondary nutrients are micronutrients selected based on the requisite needs of the species.

8. The method as in claim 7, wherein the growth element comprises a structure that exposes the roots and foliage of the species; and wherein steps (b) and (f) comprises providing a first set of nutrients to the foliage and a different second set of nutrients to the roots.

9. The method as in claim 1, wherein the gain factor $g_e$ is at least 10.

10. The method as in claim 1, wherein step (e) comprise delivery of light by pulsed illumination at intensities not to exceed the saturating level to maximize temporal gain factor and to minimize photorespiration losses.

11. The method as in claim 1, wherein the enclosed environment is impervious to pests, microbes, uncontrolled fluids, gases, and particulates, and the interior containing the growth layers is shielded and insulated from uncontrolled fluctuating ambient temperatures.

12. The method as in claim 11, wherein steps (d) and (h) use one or more load-lock systems to maintain sterilization.

13. The method as in claim 1, wherein the growth elements containing plant species do not contain soil.

* * * * *